(12) United States Patent
Acharya et al.

(10) Patent No.: US 12,379,470 B2
(45) Date of Patent: Aug. 5, 2025

(54) SENSOR UNIT WITH ROTATING HOUSING AND SPOILER FOR ENHANCED AIRFLOW

(71) Applicant: Waymo LLC, Mountain View, CA (US)

(72) Inventors: Rutvik Acharya, San Jose, CA (US); Simon Ellgas, San Jose, CA (US); Justin Andrade, San Jose, CA (US); Jun Hou, Shanghai (CN); Andreas Bauer, San Jose, CA (US); Zhaokun Wang, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 841 days.

(21) Appl. No.: 17/651,732

(22) Filed: Feb. 18, 2022

(65) Prior Publication Data

US 2023/0266440 A1    Aug. 24, 2023

(51) Int. Cl.
*G01S 7/481* (2006.01)
*G01S 17/931* (2020.01)

(52) U.S. Cl.
CPC .......... *G01S 7/4813* (2013.01); *G01S 17/931* (2020.01)

(58) Field of Classification Search
CPC ..... G01S 7/4813; G01S 17/931; G01S 7/4817
See application file for complete search history.

(56) References Cited

U.S. PATENT DOCUMENTS

| | | | |
|---|---|---|---|
| 7,984,652 B2 | 7/2011 | Hausler et al. | |
| 9,904,375 B1* | 2/2018 | Donnelly | G05D 1/00 |
| 10,359,303 B1 | 7/2019 | Krishnan et al. | |
| 10,869,406 B1 | 12/2020 | Diehl et al. | |
| 11,150,669 B2 | 10/2021 | Diehl et al. | |
| 11,220,154 B2 | 1/2022 | Diehl et al. | |
| 2017/0369106 A1* | 12/2017 | Williams | B60R 11/04 |
| 2019/0179028 A1* | 6/2019 | Pacala | G01S 7/4865 |
| 2019/0210423 A1* | 7/2019 | Ghannam | B60H 1/00271 |
| 2019/0212174 A1 | 7/2019 | Krishnan et al. | |
| 2019/0232754 A1 | 8/2019 | Horng et al. | |
| 2020/0191614 A1 | 6/2020 | Ellgas et al. | |

(Continued)

FOREIGN PATENT DOCUMENTS

| CN | 107449458 A | 12/2017 |
|---|---|---|
| CN | 107462675 A | 12/2017 |

(Continued)

*Primary Examiner* — Stephen S Sul
(74) *Attorney, Agent, or Firm* — McDonnell Boehnen Hulbert & Berghoff LLP

(57) ABSTRACT

Example embodiments relate to a sensor unit with rotating housing and spoiler for enhanced airflow. An example device includes one or more sensors configured to sense one or more aspects of an environment surrounding the device. The device also includes a housing that at least partially surrounds the one or more sensors. The housing and the one or more sensors are configured to rotate about a shared axis. The housing includes an inlet configured to act as an air intake for an airflow through the housing. The airflow is configured to cool the one or more sensors while the one or more sensors are operating. Further, the device includes a spoiler positioned on or near the inlet. The spoiler is configured to increase an air pressure near the inlet or promote laminar flow near the inlet in order to promote the airflow through the housing.

20 Claims, 19 Drawing Sheets

(56) References Cited

U.S. PATENT DOCUMENTS

| | | | | |
|---|---|---|---|---|
| 2020/0191918 A1* | 6/2020 | Ellgas | ................ | G02B 27/0006 |
| 2020/0387174 A1* | 12/2020 | Diehl | .................... | B60W 30/16 |
| 2020/0390001 A1* | 12/2020 | Diehl | ...................... | B60R 11/04 |
| 2021/0003670 A1* | 1/2021 | Diehl | ...................... | B60R 16/02 |
| 2021/0403023 A1* | 12/2021 | Zhao | .................... | G01S 17/931 |
| 2023/0119975 A1* | 4/2023 | Diehl | ...................... | G01S 17/87 |
| | | | | 701/28 |
| 2023/0194725 A1* | 6/2023 | Krishnan | .............. | G01S 7/4813 |
| | | | | 356/5.01 |

FOREIGN PATENT DOCUMENTS

| | | |
|---|---|---|
| CN | 209013297 U | 6/2019 |
| CN | 209229817 U | 8/2019 |

\* cited by examiner

SENSOR UNIT WITH ROTATING HOUSING AND SPOILER FOR ENHANCED AIRFLOW

BACKGROUND

Unless otherwise indicated herein, the description in this section is not prior art to the claims in this application and is not admitted to be prior art by inclusion in this section.

Autonomous vehicles, for instance, vehicles that do not require a human driver, can be used to aid in the transport of passengers or items from one location to another. Such vehicles may operate in a partially autonomous mode (e.g., driver-assistance) or a fully autonomous mode (e.g., a mode where passengers may provide some initial input, such as a pickup or destination location, and the vehicle maneuvers itself to that location without the need for additional input from the passenger or any other human). Thus, such vehicles may be used to provide transportation services.

Various types of vehicles, such as cars, trucks, motorcycles, busses, boats, airplanes, helicopters, lawn mowers, recreational vehicles, amusement park vehicles, farm equipment, construction equipment, trams, golf carts, trains, trolleys, etc., may be equipped with various types of sensors in order to detect objects in the surrounding environment of the vehicle. For example, vehicles may include sensors such as light detection and ranging (lidar) sensors, radar sensors, sonar sensors, cameras, or other imaging sensors that scan and record data from the surrounding environment. Sensor data from one or more of these sensors may be used to detect objects and their respective characteristics (position, shape, heading, speed, etc.).

Operation of these sensors may be adversely affected by the buildup of heat within the sensor itself. Typically, the sensors include a housing to protect the internal components of the sensors from debris and contaminants, but over time, the housing may trap solar heat, as well as heat generated by the various internal components of the sensor. As such, the sensor components may be subjected to increased temperature conditions during operation.

SUMMARY

Example embodiments relate to a spoiler configured to promote convective airflow through a housing of a sensor unit that surrounds one or more sensors (e.g., lidar devices). The convective airflow may be used to cool the one or more sensors (e.g., to prevent degradation or destruction of the one or more sensors). The spoiler may include a disk portion that is attached to a roof of the housing and is positioned parallel to a plane of the roof of the housing. Further, the disk portion of the spoiler may include a perforated section that acts as an air inlet and transfers ambient air to the housing. The spoiler may modify ambient airflow (e.g., and consequently pressure) around an inlet of the housing when the sensor unit is mounted on a vehicle that is moving through an environment.

In a first aspect, a device is provided. The device includes one or more sensors configured to sense one or more aspects of an environment surrounding the device. The device also includes a housing that at least partially surrounds the one or more sensors. The housing and the one or more sensors are configured to rotate about a shared axis. The housing includes an inlet configured to act as an air intake for an airflow through the housing. The airflow is configured to cool the one or more sensors while the one or more sensors are operating. Further, the device includes a spoiler positioned on or near the inlet. The spoiler is configured to increase an air pressure near the inlet or promote laminar flow near the inlet in order to promote the airflow through the housing.

In a second aspect, a system is provided. The system includes a vehicle. The system also includes one or more sensors configured to sense one or more aspects of an environment surrounding the system. The one or more sensors are mounted to the vehicle. In addition, the system includes a housing that at least partially surrounds the one or more sensors. The housing and the one or more sensors are configured to rotate about a shared axis. The housing includes an inlet configured to act as an air intake for an airflow through the housing. The airflow is configured to cool the one or more sensors while the one or more sensors are operating. Further, the system includes a spoiler positioned on or near the inlet. The spoiler is configured to increase an air pressure near the inlet or promote laminar flow near the inlet in order to promote the airflow through the housing.

These as well as other aspects, advantages, and alternatives will become apparent to those of ordinary skill in the art by reading the following detailed description, with reference, where appropriate, to the accompanying drawings.

DETAILED DESCRIPTION

Figure 1:
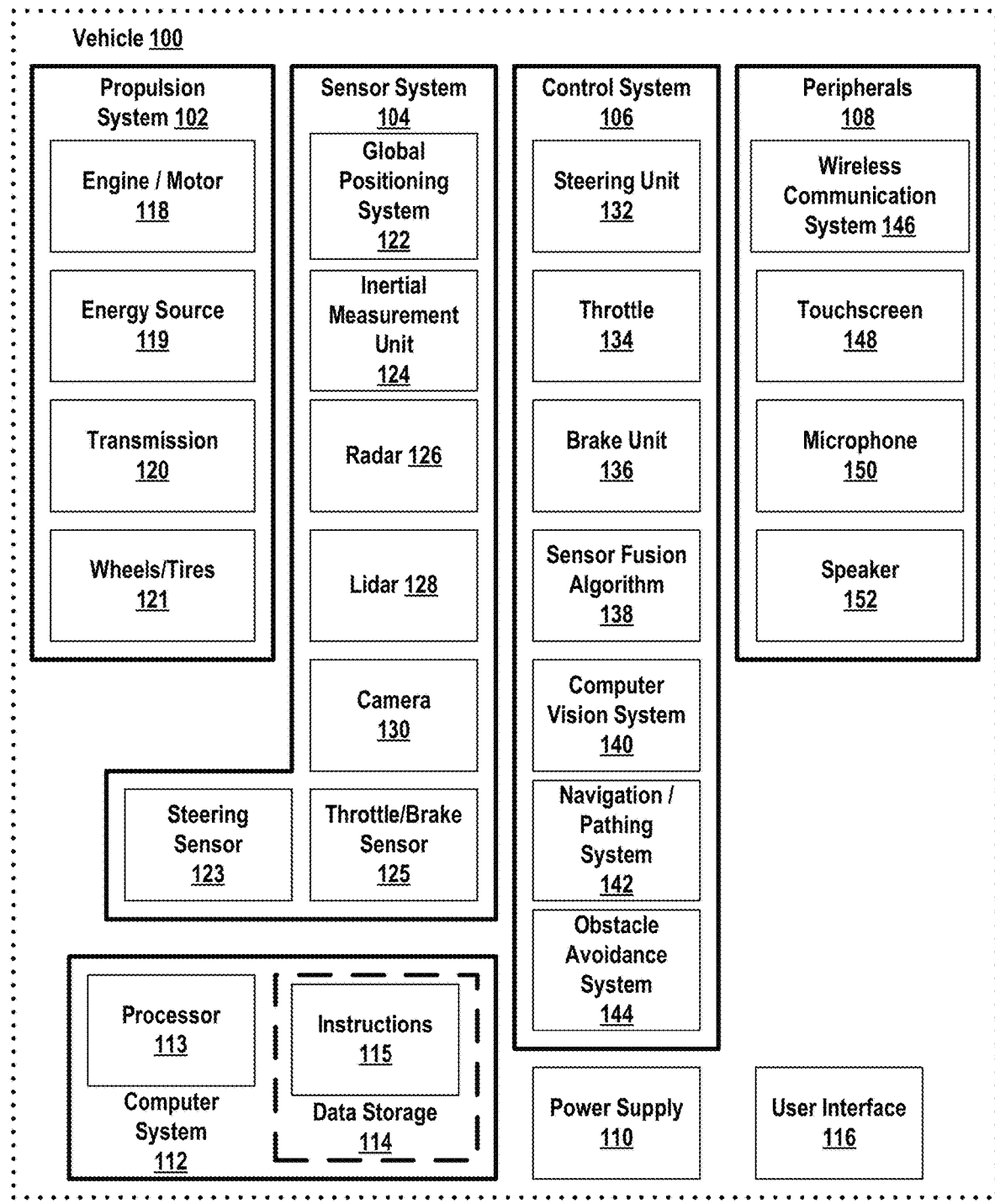
FIG. 1 is a functional block diagram illustrating a vehicle, according to example embodiments.

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

Lidar devices as described herein can include one or more light emitters and one or more detectors used for detecting light that is emitted by the one or more light emitters and reflected by one or more objects in an environment surrounding the lidar device. As an example, the surrounding environment could include an interior or exterior environment, such as an inside of a building or an outside of a building. Additionally or alternatively, the surrounding environment could include an interior of a vehicle. Still further, the surrounding environment could include a vicinity around and/or on a roadway. Examples of objects in the surrounding environment include, but are not limited to, other vehicles, traffic signs, pedestrians, bicyclists, roadway surfaces, buildings, terrain, etc. Additionally, the one or more light emitters could emit light into a local environment of the lidar itself. For example, light emitted from the one or more light emitters could interact with a housing of the lidar and/or surfaces or structures coupled to the lidar. In some cases, the lidar could be mounted to a vehicle, in which case the one or more light emitters could be configured to emit light that interacts with objects within a vicinity of the vehicle. Further, the light emitters could include optical fiber amplifiers, laser diodes, light-emitting diodes (LEDs), among other possibilities.

Example embodiments described herein relate to cooling the interior of a housing of a sensor unit (e.g., a sensor unit mounted on a vehicle operating in a partially or fully autonomous mode and used for object detection and avoidance), and associated sensors positioned therein, using convective air flow. In this regard, a sensor unit may include: one or more sensors that sense one or more aspects of a surrounding environment (e.g., distances to one or more objects, reflectivities of one or more objects, relative positions of one or more objects, ambient temperature, ambient air pressure, etc.); a housing that at least partially surrounds the one or more sensors and includes an inlet; and a spoiler positioned on or near the inlet. The housing may protect the one or more sensors from environmental elements, such as rain, snow, dust, and other such debris. However, operation of one or more sensors and/or atmospheric heating (i.e. heating resulting from sunlight or ambient temperature) may result in excessive heat buildup within the housing. Such excessive heat may adversely affect the operation of the one or more sensors (e.g., resulting in degradation or failure of the one or more sensors).

To dissipate the heat within the housing and near the one or more sensors, a convective airflow may be passed through the housing. In other words, the convective airflow may be passed over the one or more sensors to cool the one or more sensors. In order to generate the convective airflow, a pressure differential between the inlet of the housing and an outlet is established. This may involve establishing a higher pressure region near the inlet of the housing and a lower pressure region near the outlet. In some cases, during normal operation of the sensor unit, such a pressure differential may be established naturally (e.g., based on the position of the sensor unit and ambient airflow in the vicinity of the inlet/outlet).

However, in some operating environments, such a pressure differential may not be readily established. For example, if the sensor unit is used for object detection and avoidance or navigation in a vehicle, the sensor unit may be mounted on top of the vehicle. As such, the sensor unit may experience ambient airflow generated by the movement of the vehicle (i.e., as the vehicle drives on a roadway, an airflow around the vehicle may be produced). This ambient airflow may affect the pressure near the inlet and/or the outlet, which may adversely affect the pressure differential used to produce the convective airflow that cools the one or more sensors. For example, as a velocity of the ambient airflow near the inlet increases (e.g., with increasing speed of the vehicle), the pressure near the inlet may decrease (e.g., according to Bernoulli's principle). At a threshold vehicle speed, such an effect may result in the relative pressure at the inlet being the same as the relative pressure at the outlet. This may result in an elimination of the cooling convective airflow through the housing of the sensor unit (e.g., due to a lack of pressure differential). Further, at even higher vehicle speeds, the effect described above may result in the relative pressure at the inlet actually being lower than relative pressure at the outlet, thereby resulting in a reversal of the direction of the convective airflow through the housing of the sensor unit.

As described above, a lack of convective airflow to cool the one or more sensors may lead to degradation or failure of the one or more sensors. Further, it may be undesirable and/or unmanageable to have a convective airflow (and, thereby, a cooling status) of the sensor unit that strongly depends on the speed of travel of the vehicle. As such, embodiments described herein may also include a spoiler (e.g., made of metal or injection-molded plastic). The spoiler may be positioned on or near the inlet and may be configured to increase the air pressure near the inlet. By increasing the air pressure near the inlet, the spoiler may help maintain the pressure differential between the inlet and the outlet, thereby promoting convective airflow through the housing, which results in a cooling of the one or more sensors. In some embodiments, the one or more sensors and the housing of the sensor unit may also be rotated about a shared axis. For example, a motor may rotate the one or more sensors and the housing about the shared axis in order to expand a field of view of the one or more sensors (e.g., when the one or more sensors sense the surrounding environment through a window or an aperture defined within the housing). Such a rotation may enhance cooling convective airflow (e.g., centrifugally).

The spoiler may be configured to increase the air pressure near the inlet and/or to promote laminar flow (e.g., laminar ambient air flow) near the inlet. Both of these features of the spoiler may ultimately sustain and/or enhance the cooling convective airflow within the housing. The spoiler may further be designed to limit unnecessary drag as ambient air flows near the spoiler (e.g., while an associated vehicle is in motion). In some embodiments, the spoiler may include a disk portion (e.g., a substantially planar disk portion). For example, the disk portion may be positioned parallel to a planar surface of a roof of the sensor unit housing (e.g., where the roof has the inlet defined therein, such as by having perforations defined within the roof). Further, the disk portion may include a perforated section, which allows external air to be uptaken at the inlet. Additionally, in some embodiments, the disk portion may be connected to the housing (e.g., to the roof of the housing) using one or more connectors. Such connectors may be shaped as fins (e.g., impeller blades) to further promote the convective airflow through the housing (e.g., the fins may be shaped to promote the convective airflow based on a direction of rotation of the housing and/or the one or more sensors about the shared axis). In some embodiments, edges of the disk portion and/or of the fins may be rounded so as to reduce drag. Still further, in some embodiments, the spoiler may also be rotated about the shared axis (e.g., by the motor when the spoiler is directly connected to the housing). Additionally or alternatively, in some embodiments, the spoiler may include one or more funnel portions. The funnel portion(s) may be configured to direct air into the inlet.

In embodiments where the sensor unit is being used by a vehicle to sense the surrounding environment, the sensor unit may be directly attached to the vehicle. Attaching the sensor unit to the vehicle may include seating the housing within a mount (e.g., a mount that is connected to the vehicle). The mount may remain stationary in certain embodiments while the housing and the one or more sensors rotate about a shared axis. Additionally, the mount may receive outgoing air from the housing (e.g., may receive the convective airflow once the convective airflow has passed over and/or around the one or more sensors). Further, the mount may include a cowling that at least partially surrounds the housing. The cowling may include an outlet (e.g., one or more slits or louvers) that acts as an air outtake for the convective airflow once the convective airflow passes into the mount.

Still further, in some embodiments, multiple sensor units may be attached to a single vehicle. For example, a semi-truck (e.g., including a tractor and a trailer) may have a plurality of sensor units attached in a plurality of locations (e.g., a first sensor unit cantilevered out from and above a passenger side of the tractor and a second sensor unit cantilevered out from and above a driver side of the tractor).

While the sensor units described throughout this disclosure are described as being used for object detection and avoidance and/or navigation for a vehicle, it is understood that the techniques described herein remain broadly applicable. For example, a spoiler may be used to promote a convective airflow (e.g., through maintaining or enhancing a pressure differential) to cool one or more sensors (e.g., one or more sensors configured to rotate about an axis) in various sensor contexts (e.g., including non-vehicular contexts).

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks (e.g., pickup trucks, vans, tractors, tractor trailers, etc.), motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, robot devices, etc. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, example vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles, etc.) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), emergency braking, etc.), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway, etc.) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion, etc.) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118, etc.). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, brake wear, etc.).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar configured to obtain measurements of the surrounding environment of vehicle 100.

Lidar 128 may include one or more laser sources, a laser scanner, and one or more detectors, among other system components, and may operate in a coherent mode (e.g., using heterodyne detection, etc.) or in an incoherent detection mode (i.e., time-of-flight mode). In some embodiments, the one or more detectors of the lidar 128 may include one or more photodetectors, which may be especially sensitive detectors (e.g., avalanche photodiodes, etc.). In some examples, such photodetectors may be capable of detecting single photons (e.g., single-photon avalanche diodes (SPADs), etc.). Further, such photodetectors can be arranged (e.g., through an electrical connection in series, etc.) into an array (e.g., as in a silicon photomultiplier (SiPM), etc.). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, a night vision camera, etc.) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve, a carburetor, etc.). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor such as a central processing unit (CPU), a specialized processor such as a graphical processing unit (GPU) or a tensor processing unit (TPU), an application-specific integrated circuit (ASIC), a field programmable gate array (FPGA), a volatile memory, a non-volatile memory, one or more machine-learned models, etc.) operable to process and analyze images in an effort to determine objects that are in motion (e.g., other vehicles, pedestrians, bicyclists, animals, etc.) and objects that are not in motion (e.g., traffic lights, roadway boundaries, speedbumps, potholes, etc.). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, interior microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic, etc.) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, control system 106, etc.), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E show an example vehicle 200 (e.g., a fully autonomous vehicle or semi-autonomous vehicle, etc.) that can include some or all of the functions described in connection with vehicle 100 in reference to FIG. 1. Although vehicle 200 is illustrated in FIGS. 2A-2E as a van with side view mirrors for illustrative purposes, the present disclosure is not so limited. For instance, the vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices, etc.).

The example vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras, etc.), one or more lidars, one or more radars, one or more inertial sensors, one or more humidity sensors, one or more acoustic sensors (e.g., microphones, sonar devices, etc.), or one or more other sensors configured to sense information about an environment surrounding the vehicle 200. In other words, any sensor system now known or later created could be coupled to the vehicle 200 and/or could be utilized in conjunction with various operations of the vehicle 200. As an example, a lidar could be utilized in self-driving or other types of navigation, planning, perception, and/or mapping operations of the vehicle 200. In addition, sensor systems 202, 204, 206, 208, 210, 212, 214, and/or 218 could represent a combination of sensors described herein (e.g., one or more lidars and radars; one or more lidars and cameras; one or more cameras and radars; one or more lidars, cameras, and radars; etc.).

Note that the number, location, and type of sensor systems (e.g., 202, 204, etc.) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, to adapt to specialized environmental or application circumstances, etc.). For example, the sensor systems (e.g., 202, 204, etc.) could be disposed in various other locations on the vehicle (e.g., at location 216, etc.) and could have fields of view that correspond to internal and/or surrounding environments of the vehicle 200.

The sensor system 202 may be mounted atop the vehicle 200 and may include one or more sensors configured to detect information about an environment surrounding the vehicle 200, and output indications of the information. For example, sensor system 202 can include any combination of cameras, radars, lidars, inertial sensors, humidity sensors, and acoustic sensors (e.g., microphones, sonar devices, etc.). The sensor system 202 can include one or more movable mounts that could be operable to adjust the orientation of one or more sensors in the sensor system 202. In one embodiment, the movable mount could include a rotating platform that could scan sensors so as to obtain information from each direction around the vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of the sensor locations 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar sensors. For example, the lidar sensors could include a plurality of light-emitter devices arranged over a range of angles with respect to a given plane (e.g., the x-y plane, etc.). For example, one or more of the sensor systems 202, 204, 206, 208, 210, 212, 214, and/or 218 may be configured to rotate or pivot about an axis (e.g., the z-axis, etc.) perpendicular to the given plane so as to illuminate an environment surrounding the vehicle 200 with light pulses. Based on detecting various aspects of reflected light pulses (e.g., the elapsed time of flight, polarization, intensity, etc.), information about the surrounding environment may be determined.

In an example embodiment, sensor systems 202, 204, 206, 208, 210, 212, 214, and/or 218 may be configured to provide respective point cloud information that may relate to physical objects within the surrounding environment of the vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, the example vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz, etc.). Such radio waves may be used to determine the distance to and/or velocity of one or more objects in the surrounding environment of the vehicle 200. For example, one or more sensor systems 202, 204, 206, 208, 210, 212, 214, and/or 218 could include one or more radars. In some examples, one or more radars can be located near the rear of the vehicle 200 (e.g., sensor systems 208, 210, etc.), to actively scan the environment near the back of the vehicle 200 for the presence of radio-reflective objects. Similarly, one or more radars can be located near the front of the vehicle 200 (e.g., sensor systems 212, 214, etc.) to actively scan the environment near the front of the vehicle 200. A radar can be situated, for example, in a location suitable to illuminate a region including a forward-moving path of the vehicle 200 without occlusion by other features of the vehicle 200. For example, a radar can be embedded in and/or mounted in or near the front bumper, front headlights, cowl, and/or hood, etc. Furthermore, one or more additional radars can be located to actively scan the side and/or rear of the vehicle 200 for the presence of radio-reflective objects, such as by including such devices in or near the rear bumper, side panels, rocker panels, and/or undercarriage, etc.

The vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which the vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may also include one or more acoustic sensors (e.g., one or more of the sensor systems 202, 204, 206, 208, 210, 212, 214, 216, 218 may include one or more acoustic sensors, etc.) used to sense a surrounding environment of vehicle 200. Acoustic sensors may include microphones (e.g., piezoelectric microphones, condenser microphones, ribbon microphones, microelectromechanical systems (MEMS) microphones, etc.) used to sense acoustic waves (i.e., pressure differentials) in a fluid (e.g., air, etc.) of the environment surrounding the vehicle 200. Such acoustic sensors may be used to identify sounds in the surrounding environment (e.g., sirens, human speech, animal sounds, alarms, etc.) upon which control strategy for vehicle 200 may be based. For example, if the acoustic sensor detects a siren (e.g., an ambulatory siren, a fire engine siren, etc.), vehicle 200 may slow down and/or navigate to the edge of a roadway.

Although not shown in FIGS. 2A-2E, the vehicle 200 can include a wireless communication system (e.g., similar to the wireless communication system 146 of FIG. 1 and/or in addition to the wireless communication system 146 of FIG. 1, etc.). The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 2A:
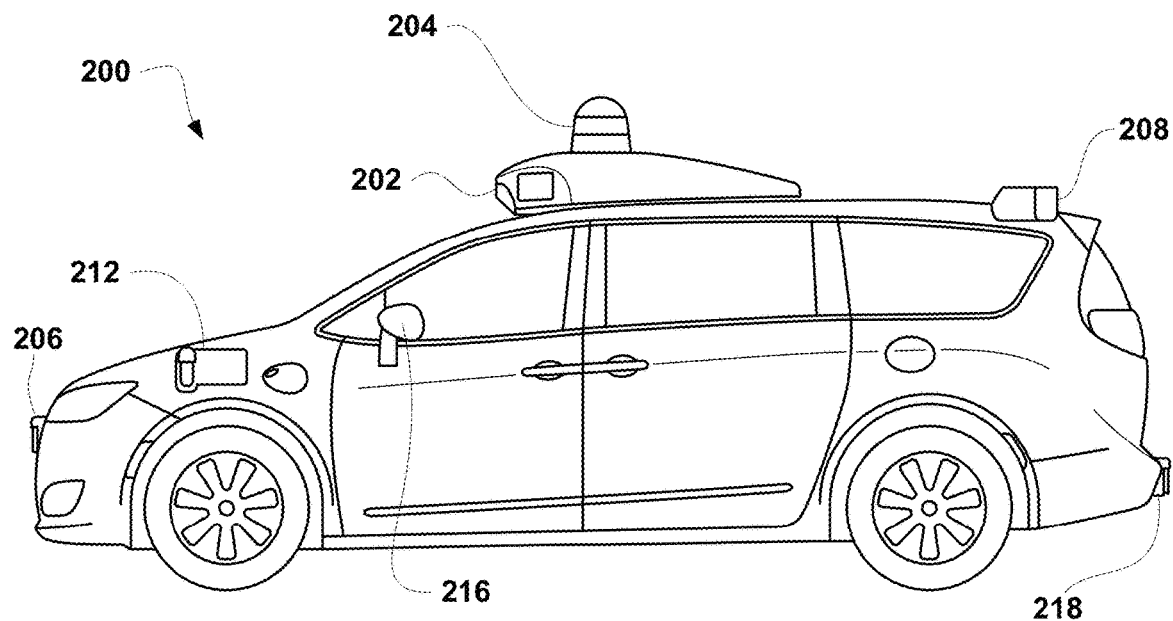
FIG. 2A is an illustration of a physical configuration of a vehicle, according to example embodiments.
Figure 2B:
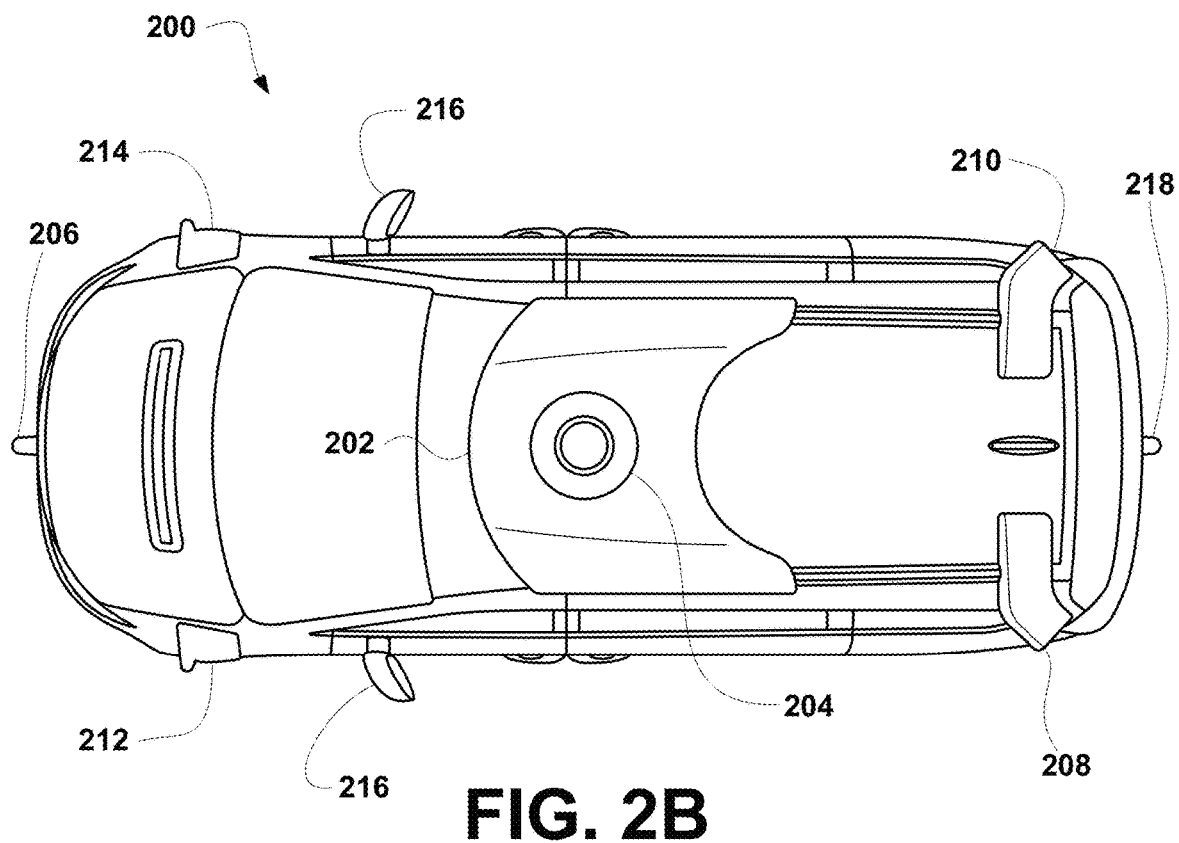
FIG. 2B is an illustration of a physical configuration of a vehicle, according to example embodiments.
Figure 2C:
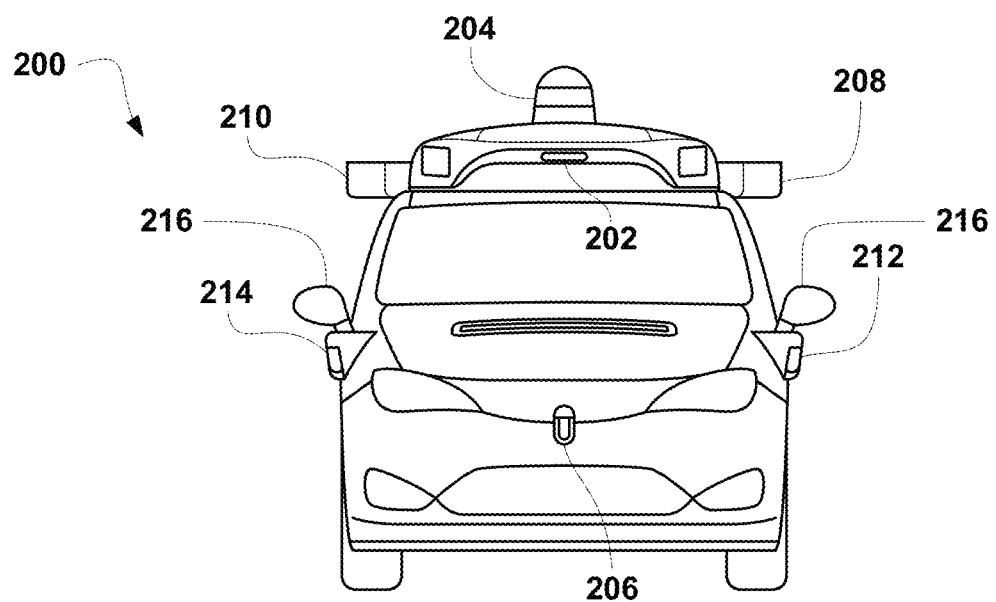
FIG. 2C is an illustration of a physical configuration of a vehicle, according to example embodiments.
Figure 2D:
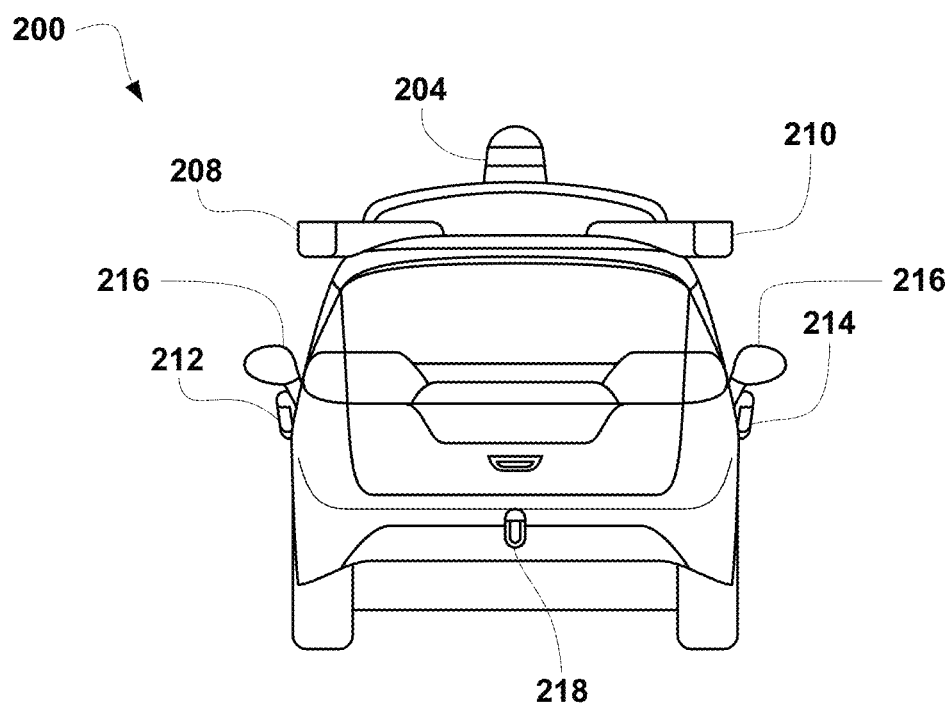
FIG. 2D is an illustration of a physical configuration of a vehicle, according to example embodiments.
Figure 2E:
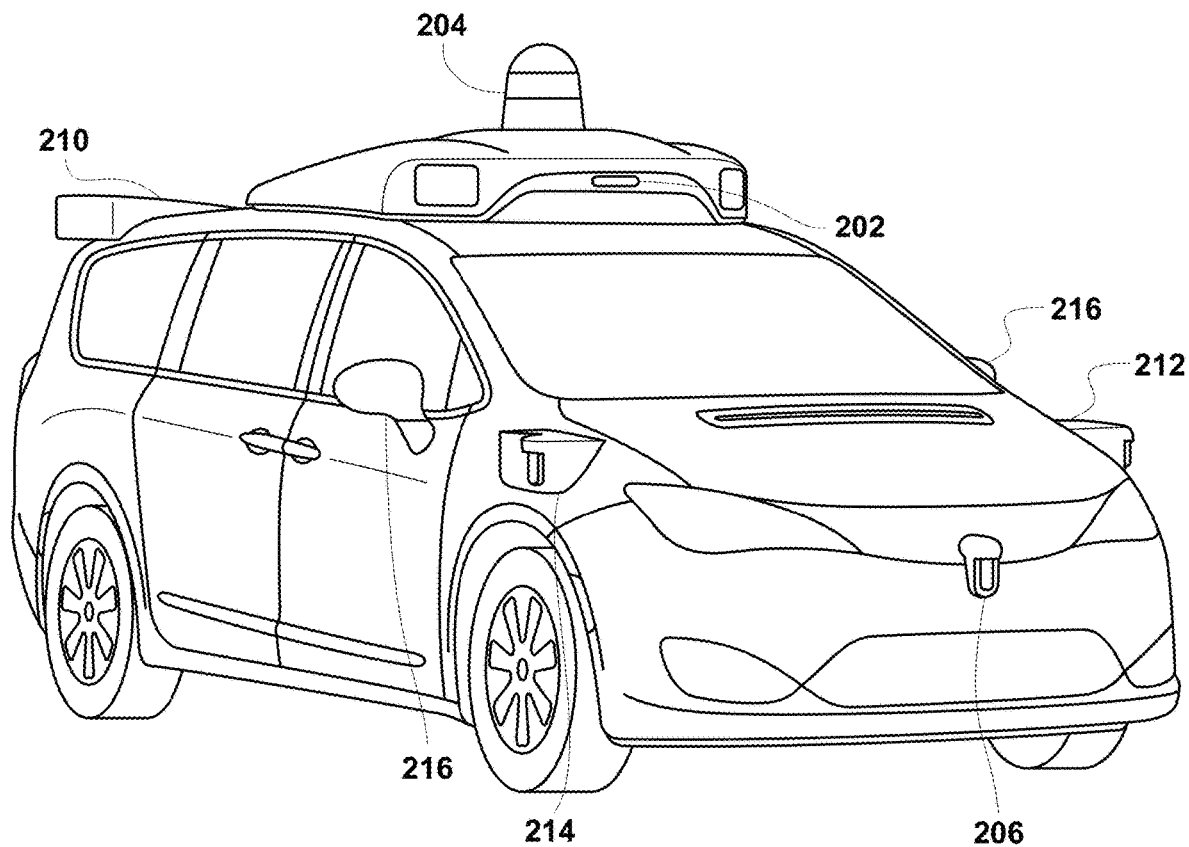
FIG. 2E is an illustration of a physical configuration of a vehicle, according to example embodiments.
Figure 2F:
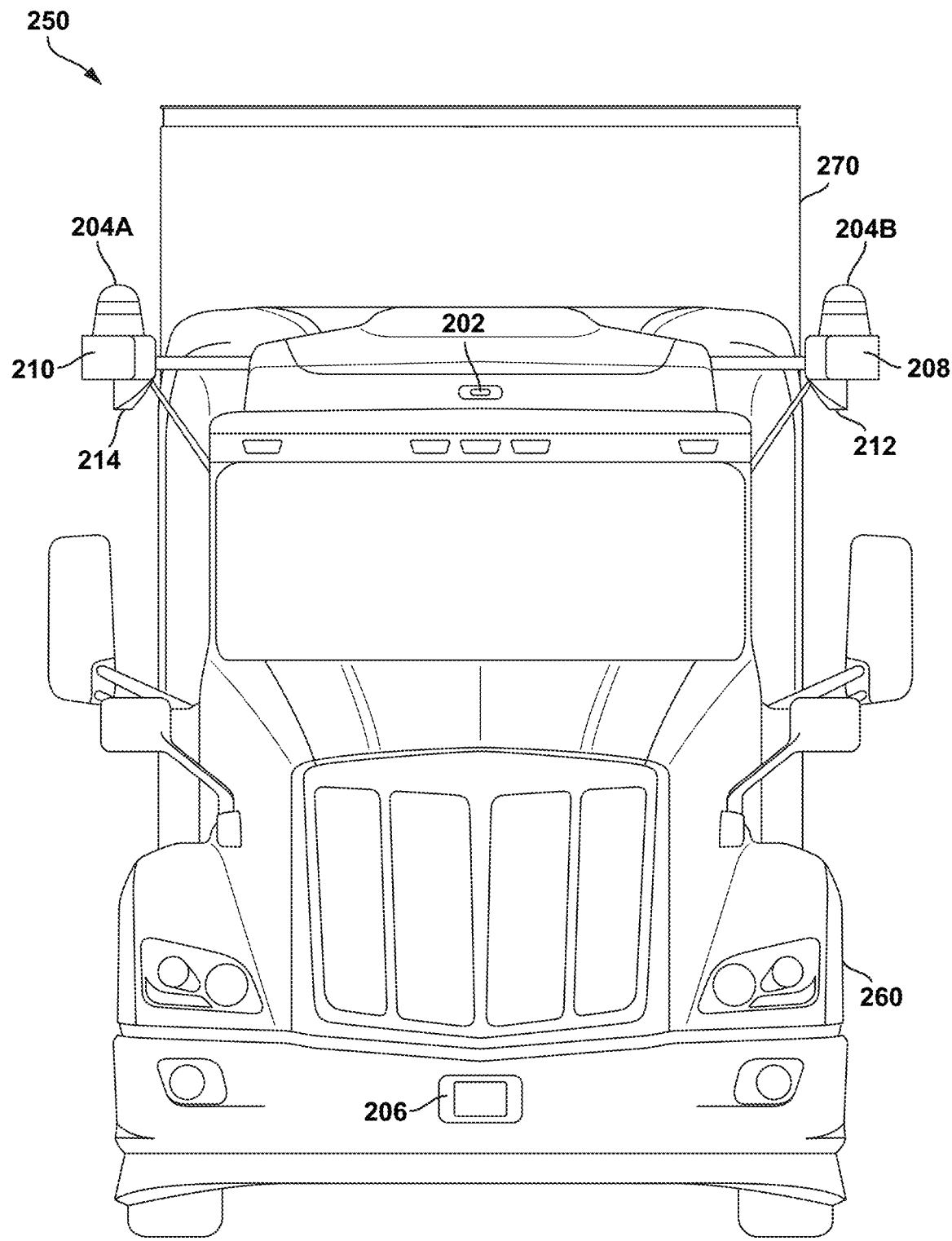
FIG. 2F is an illustration of a physical configuration of a vehicle, according to example embodiments.
Figure 2G:
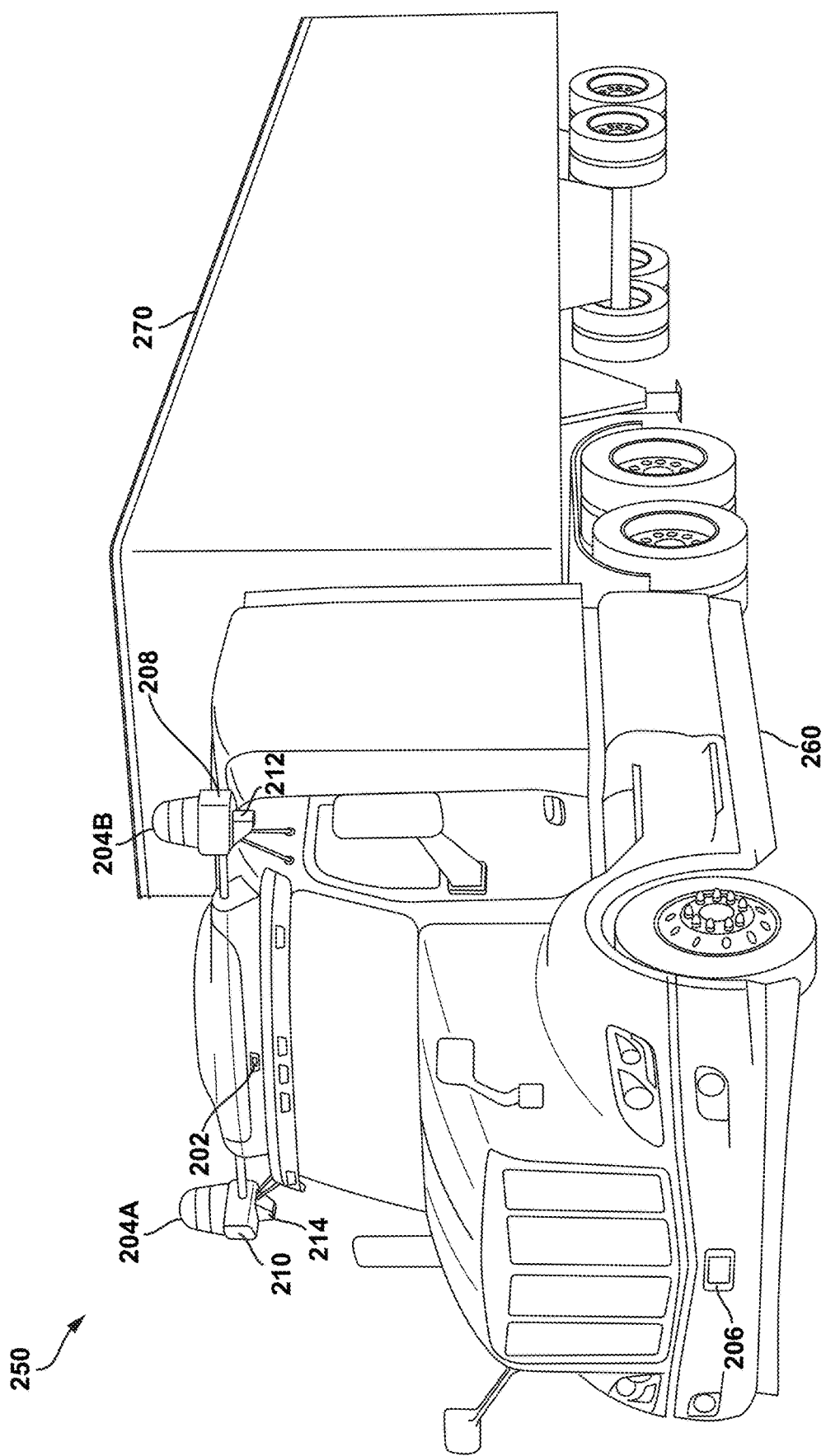
FIG. 2G is an illustration of a physical configuration of a vehicle, according to example embodiments.
Figure 2H:
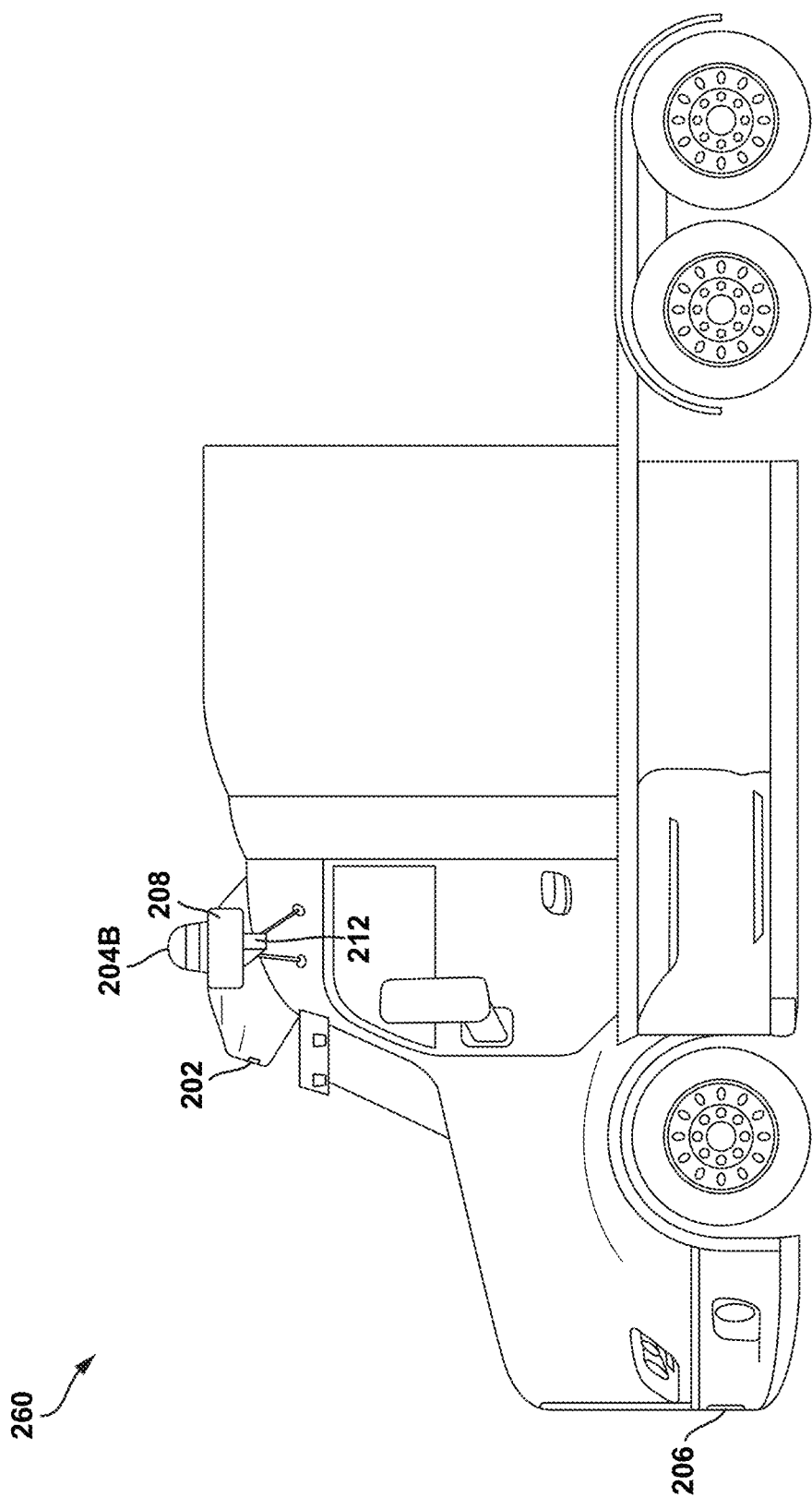
FIG. 2H is an illustration of a physical configuration of a vehicle, according to example embodiments.
Figure 2I:
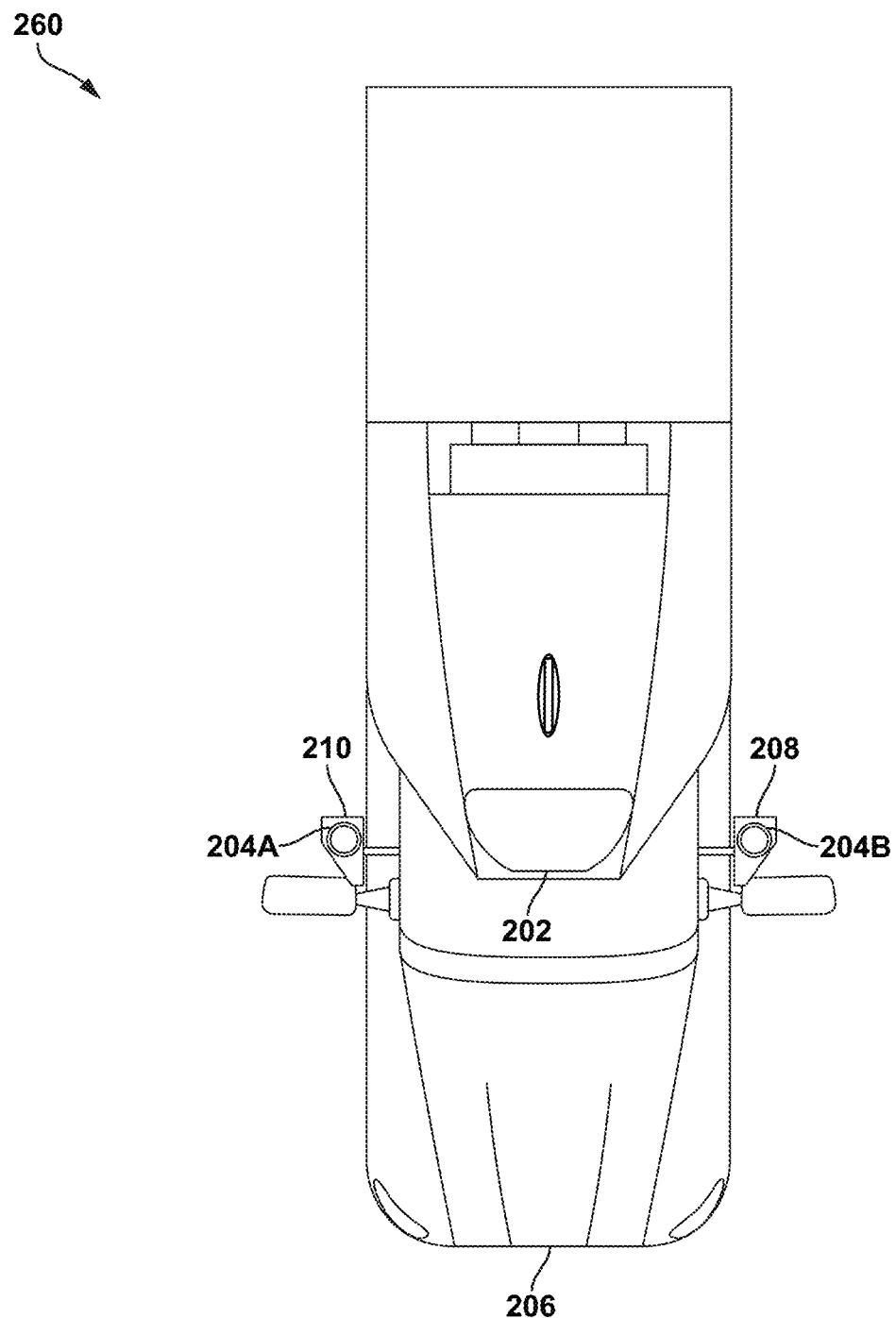
FIG. 2I is an illustration of a physical configuration of a vehicle, according to example embodiments.

As described above, in some embodiments, the vehicle 200 may take the form of a van, but alternate forms are also possible and are contemplated herein. As such, FIGS. 2F-2I illustrate embodiments where a vehicle 250 takes the form of a semi-truck. For example, FIG. 2F illustrates a front-view of the vehicle 250 and FIG. 2G illustrates an isometric view of the vehicle 250. In embodiments where the vehicle 250 is a semi-truck, the vehicle 250 may include a tractor portion 260 and a trailer portion 270 (illustrated in FIG. 2G). FIGS. 2H and 2I provide a side view and a top view, respectively, of the tractor portion 260. Similar to the vehicle 200 illustrated above, the vehicle 250 illustrated in FIGS. 2F-2I may also include a variety of sensor systems (e.g., similar to the sensor systems 202, 206, 208, 210, 212, 214 shown and described with reference to FIGS. 2A-2E). In some embodiments, whereas the vehicle 200 of FIGS. 2A-2E may only include a single copy of some sensor systems (e.g., the sensor system 204), the vehicle 250 illustrated in FIGS. 2F-2I may include multiple copies of that sensor system (e.g., the sensor systems 204A and 204B, as illustrated).

While drawings and description throughout may reference a given form of vehicle (e.g., the semi-truck vehicle 250 or the van vehicle 200), it is understood that embodiments described herein can be equally applied in a variety of vehicle contexts (e.g., with modifications employed to account for a form factor of vehicle). For example, sensors and/or other components described or illustrated as being part of the van vehicle 200 could also be used (e.g., for navigation and/or obstacle detection and avoidance) in the semi-truck vehicle 250

Figure 2J:
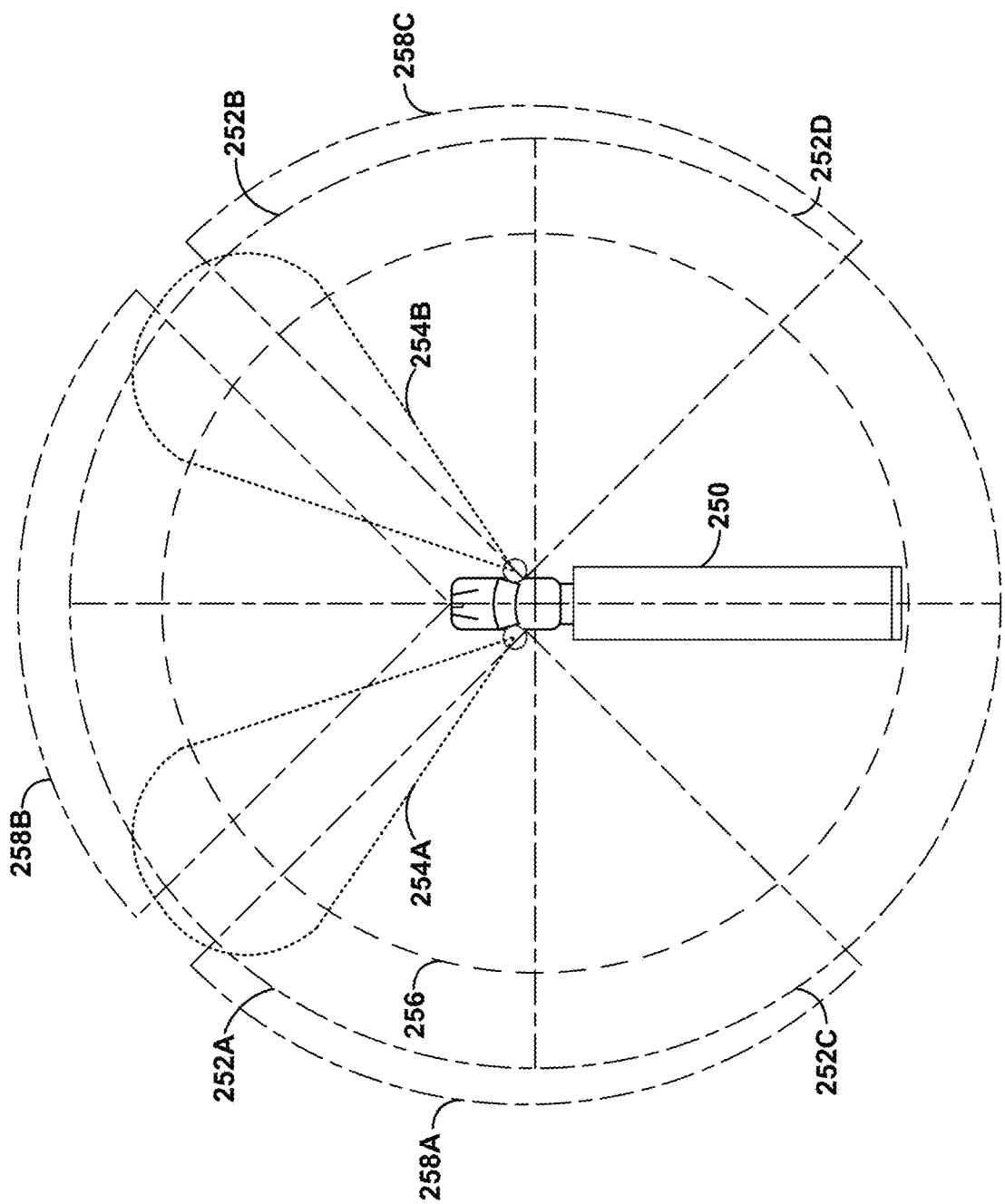
FIG. 2J is an illustration of a field of view for various sensors, according to example embodiments.

FIG. 2J illustrates various sensor fields of view (e.g., associated with the vehicle 250 described above). As described above, vehicle 250 may contain a plurality of sensors/sensor units. The locations of the various sensors may correspond to the locations of the sensors disclosed in FIGS. 2F-2I, for example. However, in some instances, the sensors may have other locations. Sensors location reference numbers are omitted from FIG. 2J for simplicity of the drawing. For each sensor unit of vehicle 250, FIG. 2J illustrates a representative field of view (e.g., fields of view labeled as 252A, 252B, 252C, 252D, 254A, 254B, 256, 258A, 258B, and 258C). The field of view of a sensor may include an angular region (e.g., an azimuthal angular region and/or an elevational angular region) over which the sensor may detect objects.

Figure 2K:
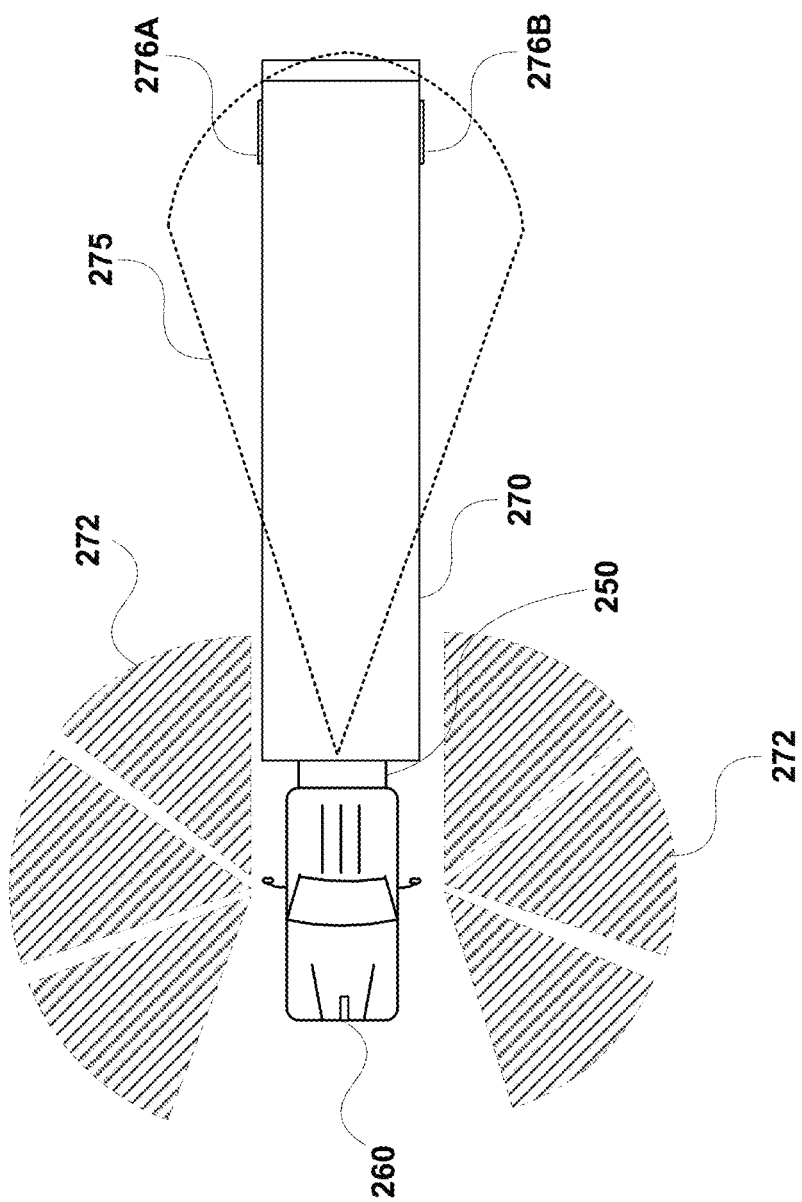
FIG. 2K is an illustration of beam steering for a sensor, according to example embodiments.

FIG. 2K illustrates beam steering for a sensor of a vehicle (e.g., the vehicle 250 shown and described with reference to FIGS. 2F-2J), according to example embodiments. In various embodiments, a sensor unit of vehicle 250 may be a radar, a lidar, a sonar, etc. Further, in some embodiments, during the operation of the sensor, the sensor may be scanned within the field of view of the sensor. Various different scanning angles for an example sensor are shown as regions 272, which each indicate the angular region over which the sensor is operating. The sensor may periodically or iteratively change the region over which it is operating. In some embodiments, multiple sensors may be used by vehicle 250 to measure regions 272. In addition, other regions may be included in other examples. For instance, one or more sensors may measure aspects of the trailer 270 of vehicle 250 and/or a region directly in front of vehicle 250.

At some angles, region of operation 275 of the sensor may include rear wheels 276A, 276B of trailer 270. Thus, the sensor may measure rear wheel 276A and/or rear wheel 276B during operation. For example, rear wheels 276A, 276B may reflect lidar signals or radar signals transmitted by the sensor. The sensor may receive the reflected signals from rear wheels 276A, 276. Therefore, the data collected by the sensor may include data from the reflections off the wheel.

In some instances, such as when the sensor is a radar, the reflections from rear wheels 276A, 276B may appear as noise in the received radar signals. Consequently, the radar may operate with an enhanced signal to noise ratio in instances where rear wheels 276A, 276B direct radar signals away from the sensor.

Figure 3:
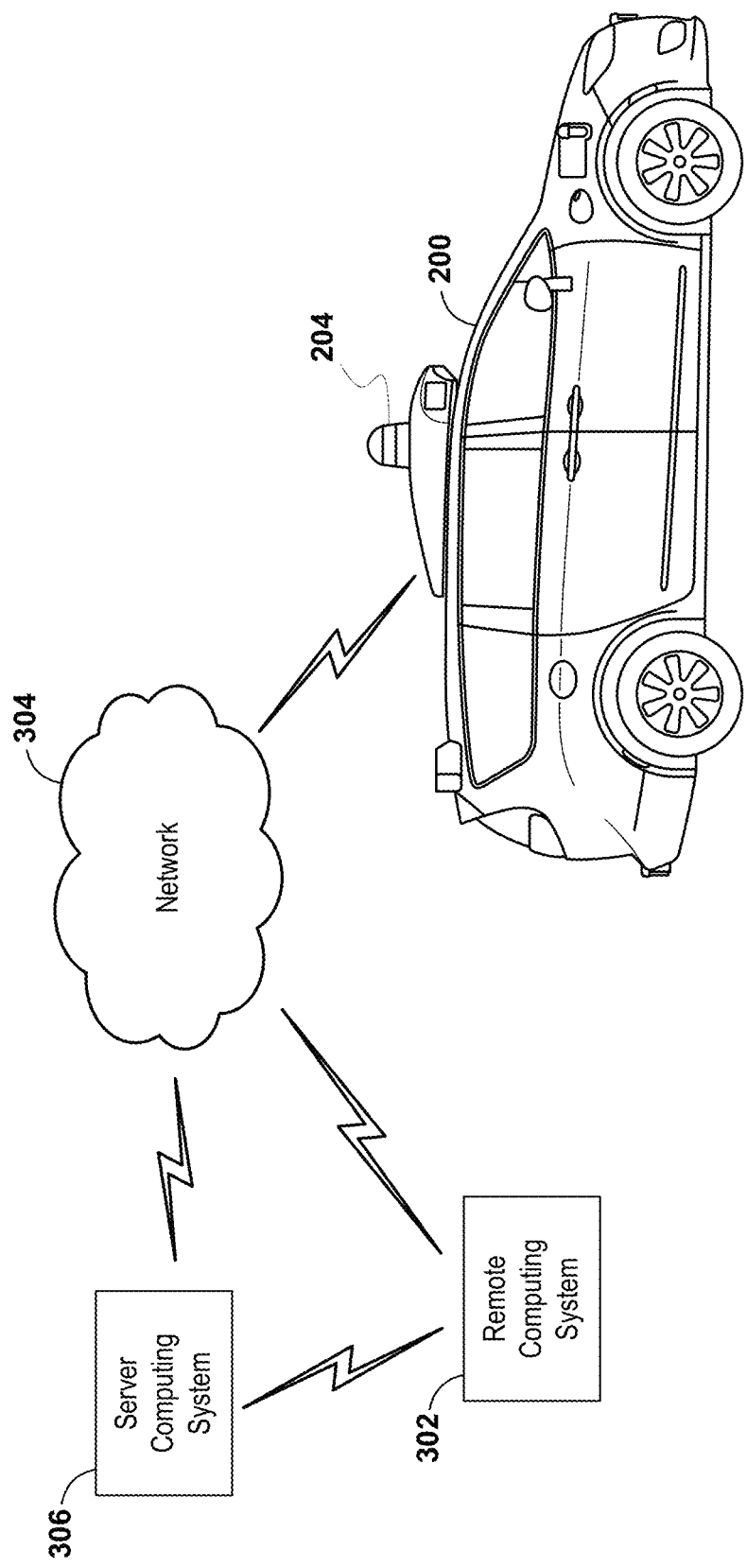
FIG. 3 is a conceptual illustration of wireless communication between various computing systems related to an autonomous or semi-autonomous vehicle, according to example embodiments.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone, etc.), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, a computing system local to vehicle 200, etc.) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200, etc.) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar, a lidar, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar may be configured to transmit an electromagnetic signal that will be reflected by various objects near the vehicle, and then capture electromagnetic signals that reflect off the objects. The captured reflected electromagnetic signals may enable the radar (or processing system) to make various determinations about objects that reflected the electromagnetic signal. For example, the distances to and positions of various reflecting objects may be determined. In some embodiments, the vehicle may have more than one radar in different orientations. The radar may be configured to store captured information to a memory for later processing by a processing system of the vehicle. The information captured by the radar may be environment data.

In another example, a lidar may be configured to transmit an electromagnetic signal (e.g., infrared light, such as that from a gas or diode laser, or other possible light source) that will be reflected by target objects near the vehicle. The lidar may be able to capture the reflected electromagnetic (e.g., infrared light, etc.) signals. The captured reflected electromagnetic signals may enable the range-finding system (or processing system) to determine a range to various objects. The lidar may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals, etc.), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present, etc.), (ii) confirm whether the vehicle's identification of the object is correct, (iii) correct the identification if the identification was incorrect, and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign, etc.), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304, etc.), and in some embodiments, via a server (e.g., server computing system 306, etc.). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction, etc.), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign, etc.), but may be configured to request remote assistance at the same time as (or at a later time from) when the vehicle operates in accordance with the detected object.

Figure 4:
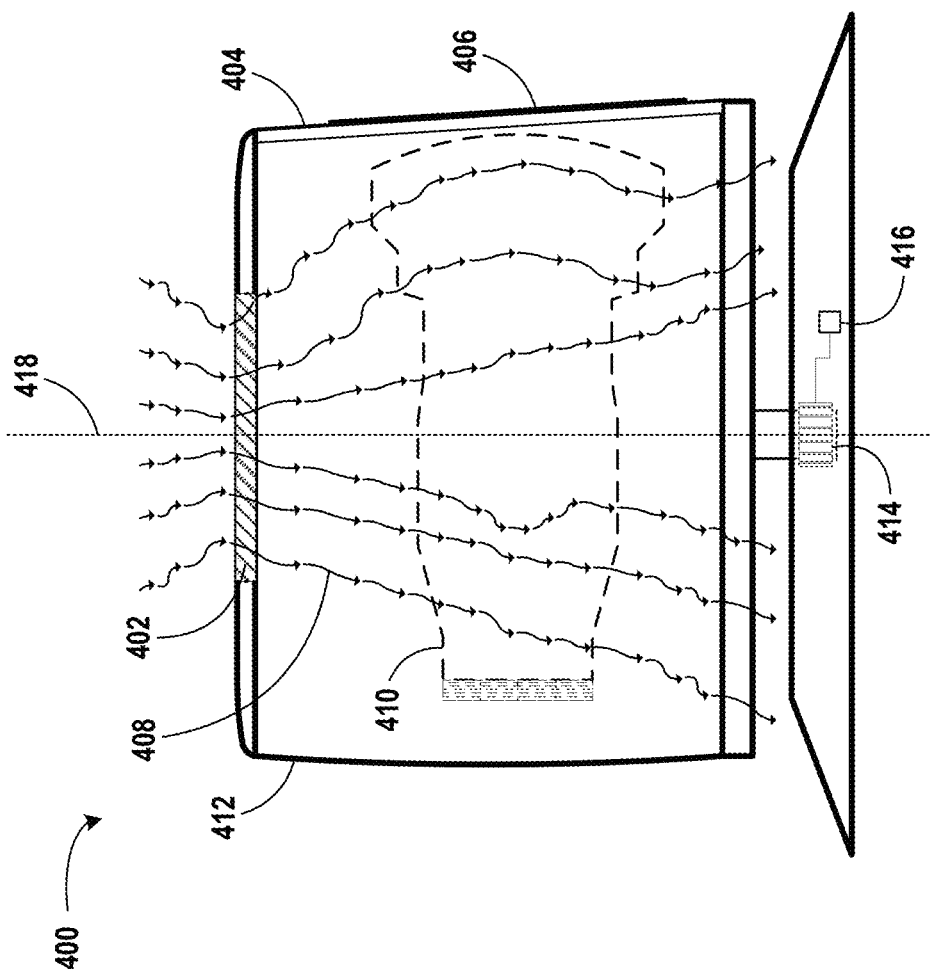
FIG. 4 is an illustration of a sensor unit, according to example embodiments.

FIG. 4 is an illustration of a sensor unit 400, according to example embodiments. The sensor unit 400 illustrated in FIG. 4 may include one or more sensors configured to sense one or more aspects of the environment surrounding the sensor unit 400. For example, as illustrated in FIG. 4, the sensor unit 400 may include a lidar device 410. Further, the sensor unit 400 may include a protective housing 412 (e.g., which includes an additional cooling component 402 that allows a convective airflow 408 along airflow paths), an optical window 404, a window coating 406, and a rotating stage 414 with an associated controller 416 configured to rotate one or more components of the sensor unit 400 (e.g., the lidar device 410, the housing 412, the additional cooling component 402, etc.) about a shared axis 418.

The lidar device 410 may include and/or be similar to lidar 128 illustrated and described above with reference to FIG. 1. For example, the lidar device 410 may include one or more light emitters, one or more light detectors, one or more lenses and/or mirrors, and a corresponding lidar controller. Based on light pulses emitted by the one or more light emitters and corresponding reflected light pulses detected by the one or more light detectors, information about the surrounding environment can be determined (e.g., and used for object detection and avoidance within a fully or partially autonomous vehicle). For example, the distance to objects in the surrounding environment and/or reflectivities of exterior surfaces of objects in the surrounding environment may be determined based on light pulses emitted by and detected by the lidar device 410. While a lidar device 410 may be described herein as an example sensor that can be at least partially encapsulated by the protective housing 412 and used to sense the surrounding environment, it is understood that the disclosure is not limited to only a lidar device. Additional or alternative types of sensors may be incorporated into the housing 412 and may be used to sense the surrounding environment. For example, one or more cameras, radars, GPS units, microphones, sonars, etc. may be located in the housing 412 (e.g., and configured to rotate about the shared axis) in addition to or instead of the lidar device 410. Other types of sensors are also possible and are contemplated herein.

The protective housing 412 may encapsulate (e.g., partially or wholly) one or more components of the lidar device 410. For example, the protective housing 412 may encapsulate one or more light emitters, one or more lenses/mirrors/aperture plates, one or more light detectors, and/or a lidar controller so as to protect each of those components from potentially detrimental exposure to the environment. Additionally or alternatively, the protective housing 412 may encapsulate one or more additional sensors (e.g., one or more auxiliary sensors other than the lidar device 410). For example, the protective housing 412 may encapsulate a thermometer, a barometer, a hygrometer, a radar, one or more additional lidar devices, a GPS unit, a camera, a sonar sensor, etc.

In some embodiments, the protective housing 412 may also encapsulate one or more communication devices that allow the lidar device 410 to communicate with one or more computing devices (e.g., computing devices of another lidar device and/or a cloud computing device, such as a remotely located cloud server). In some embodiments, the lidar device 410 and/or one or more auxiliary sensors may be connected to external processing devices (e.g., an external computing device that generates a point cloud based on data captured by the lidar device 410). For example, the lidar device 410 may transmit data used to detect objects to an external processing device or storage device. Such data may include coordinates, distances, ranges, angles (e.g., yaw/azimuth angles and/or pitch/elevation angles), detected intensities, timestamps, normals, pulse widths, beam sizes, return indices, etc. In some embodiments, a rotary data link may be used to transmit such data from the protective housing 412 along a rotary axis (e.g., the shared axis 418) connected to the rotating stage to an external device. For example, an interface waveguide may have two portions whose axes are aligned such that they can rotate adjacent to one another along the same rotary axis and communicate information to one another.

The protective housing 412 may also have an additional cooling component 402 defined therein (e.g., defined within a planar roof of the protective housing 412 as illustrated in FIG. 6) and/or thereon. The additional cooling component 402 may include one or more passive cooling components. For example, the additional cooling component 402 may include a vent/inlet (e.g., one or more perforations in the planar roof of the protective housing 412) configured to permit airflow to cool the lidar device 410/other components within the housing 412 when the housing 412 and/or the lidar device 410 are rotated about an axis (e.g., the shared axis 418). In some embodiments, an airflow that flows through the housing 412 to cool components within the housing 412 (e.g., the lidar device 410) may be directed along a vector that is substantially parallel (e.g., within 1°, within 2°, within 3°, within 4°, within 5°, within 10°, within 15°, within 20°, or within 30° of parallel) to the shared axis 418. Additionally or alternatively, the additional cooling component 402 may include one or more active cooling components (e.g., a fan configured to force air through the protective housing 412 to cool the lidar device 410). Further, the protective housing 412 may include predefined airflow paths to enhance passive cooling of the lidar device 410/other components within the housing 412. Such predefined airflow paths may be based on the location of the additional cooling component 402, one or more air outlets defined within the protective housing 412 (e.g., along a bottom side of the protective housing 412), and/or the internal design of the protective housing 412. Additionally, the predefined airflow paths may run along one or more components of the lidar device 410 (e.g., the light emitters, the light detectors, etc.) to provide enhanced cooling to the one or more components.

In some embodiments, it may be beneficial to maintain the emission wavelength(s) associated with one or more light emitters of the lidar device 410 within a narrow wavelength range. As such, it may be beneficial to maintain one or more of the light emitters within a narrow temperature range (e.g., to maintain the narrow wavelength range for emission), regardless of an ambient temperature. For example, in embodiments where the light emitters are laser diodes, it may be beneficial to maintain the light emitters within a temperature range between approximately 55° C. and 65° C. (e.g., even for ambient temperatures between −30° C. and +65° C. Other desired operating temperature ranges are also possible and are contemplated herein. As described above, one technique by which the temperature range of the light emitters can be maintained may include providing a convective airflow near the lidar device 410 (e.g., while the protective housing 412 of the sensor unit 400 rotates about the shared axis 690) to cool one or more components of the lidar device 410 (such as the light emitters). Additionally or alternatively, the temperature range of the light emitters may be maintained by actively heating or cooling the light emitters (e.g., using a thermoelectric cooler, such as a Peltier element, operated in heat-pump mode or a cooling mode; using a refrigeration device; and/or using a resistive heater). In a further attempt to maintain emission characteristics by maintaining emission temperature, in some embodiments, certain emission settings of the lidar device 410 may be modulated to maintain the temperature range of the light emitters (e.g., based on the waste heat given off by the light emitters when emitting light signals). For example, a duty cycle and/or emission power may be modulated to adjust the waste heat given off by the light emitters and, thereby, maintain the light emitters within a given temperature range.

In some embodiments, the sensor unit 400 may also include one or more optical windows 404 or apertures (e.g., defined within a wall of the housing 412). The optical windows 404 or apertures may provide a surface that mechanically protects the components of the lidar device 410 without optically isolating the lidar device 410 or other sensors from the surrounding environment (e.g., thereby still permitting the lidar device 410 or other sensor in the sensor unit 400 to sense the one or more aspects of the environment surrounding the sensor unit). In other words, light signals emitted by the lidar device 410 may be able to pass through the optical window 404 or aperture(s) to and from the environment.

In some embodiments, the optical window 404 or aperture(s) may be covered with one or more optical components. For example, the optical window 404 may be covered with a window coating 406, such as an AR coating or a hydrophobic coating. Additionally or alternatively, the optical window 404 may be covered by an optical filter (e.g., a chromatic filter or a neutral-density filter) that absorbs (and/or reflects) light not emitted by the lidar device 410 (e.g., light that is not within a wavelength range emitted by light emitters of the lidar device 410). In some embodiments, the optical window(s) 404, themselves, may be fabricated from black glass so as to effectively transmit light of wavelengths emitted by the lidar device 410 (e.g., infrared wavelengths) while blocking transmission of other wavelengths (e.g., wavelengths in the visible spectrum).

The rotating stage 414 may be configured to orient the protective housing 412 (or solely the lidar device 410) relative to the surrounding environment (e.g., in an azimuthal direction). In various embodiments, the rotating stage 414 may be configured to rotate the lidar device 410 between 0.0° and 180.0° (half-azimuthal rotation), between 0.0° and 360.0° (complete azimuthal rotation), between 0.0° and 90.0°, between 0.0° and 135.0°, etc. Other angular ranges are also possible. When the rotating stage 414 causes the protective housing 412 to rotate relative to a surrounding environment, the lidar device 410 may be cooled (e.g., based on air being forced through the predefined airflow paths 408). The rotating stage 414 may include one or more actuators (e.g., electric motors, such as servos). Further, the rotating stage 414 may be controlled by the associated controller 416 so as to orient the protective housing 412 (or the lidar device 410) in azimuth based on a predetermined pattern (e.g., stored in a memory within or associated with the associated controller 416).

Figure 5:
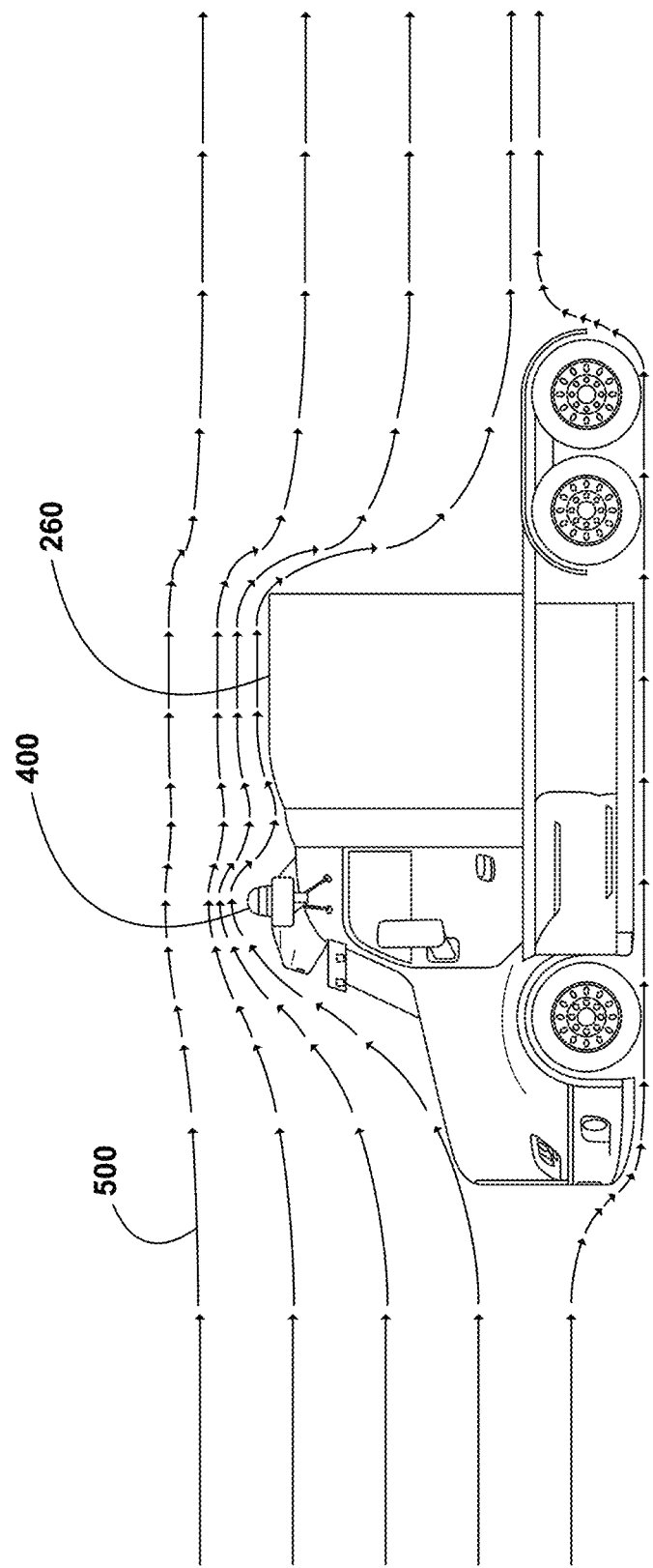
FIG. 5 is an illustration of ambient airflow near a moving vehicle, according to example embodiments.

In some embodiments, the sensor unit 400 of FIG. 4 may be used for object detection and avoidance in a vehicle (e.g., the vehicle 250 illustrated and described with reference to FIGS. 2F-2K). For example, the sensor unit 400 may be mounted on a roof of the tractor 260 of the vehicle 250, as illustrated in FIG. 5 (trailer 270 portion of the vehicle 250 omitted in the illustration). As the vehicle 250 moves (e.g., based on control signals associated with an autonomous mode of operation), an ambient airflow 500 may be produced around the vehicle 250 based on the relative velocity of the vehicle with respect to the surrounding air. In addition to or instead of being based purely on the relative velocity of the vehicle, the ambient airflow 500 (e.g., the speed of the ambient airflow 500) may be based on wind in the surrounding environment.

As illustrated by the streamlines in FIG. 5, the ambient airflow 500 may have a substantial velocity as the ambient airflow 500 moves over the roof of the vehicle 250. This may result in a low relative pressure region above the roof of the vehicle 250 (e.g., and, correspondingly, above the sensor unit 400 mounted on a roof of the vehicle 250) due to Bernoulli's principle. For example, the pressure directly above the sensor unit 400 may be lower than the pressure inside the sensor unit 400 (e.g., as the air above the sensor unit 400 is in motion relative to the sensor unit 400 while the air inside the sensor unit 400 is not necessarily in motion). Additionally, as the ambient airflow 500 may depend on the velocity of the vehicle 250, the relative pressure differential (e.g., between inside the sensor unit 400 and outside the sensor unit 400) may also correspondingly depend on the velocity of the vehicle 250. Further, the pressure differential may be based on other factors (e.g., in addition to or instead of the velocity of the vehicle 250 and the ambient windspeed). For example, as illustrated in FIG. 4, the sensor unit 400 may include a housing 412 that rotates about a shared axis 418. This rotation may further enhance and/or reduce the pressure differential between air inside the sensor unit 400 and air outside the sensor unit 400. Additionally or alternatively, temperature differentials between air within the sensor unit 400 and ambient air might also affect the pressure differential. It is understood that, under various conditions, the pressure differential between the air outside the sensor unit 400 and the air inside the sensor unit 400 may be positive (i.e., the pressure outside the sensor unit 400 is greater than the pressure inside the sensor unit 400), negative (i.e., the pressure outside the sensor unit 400 is less than the pressure inside the sensor unit 400), or zero (i.e., the pressure outside the sensor unit 400 is equal to the pressure inside the sensor unit 400).

In some embodiments, as described above with reference to FIG. 4, a convective airflow 408 may be established within the housing 412 of the sensor unit 400 (e.g., via the additional cooling component 402 and/or one or more outlets of the housing 412). This convective airflow 408 may be used to cool one or more components of the sensor unit 400. As a result of changes in the pressure differential between the inside of the sensor unit 400 and the outside of the sensor unit 400, the speed and/or direction of the convective airflow 408 may also change. Further, as the pressure differential may depend upon a speed of the vehicle 250 (e.g., for reasons described above), the convective airflow 408 speed and/or direction may, therefore, also depend upon the speed of the vehicle 250. This is illustrated in the plot of FIG. 6A.

Figure 6A:
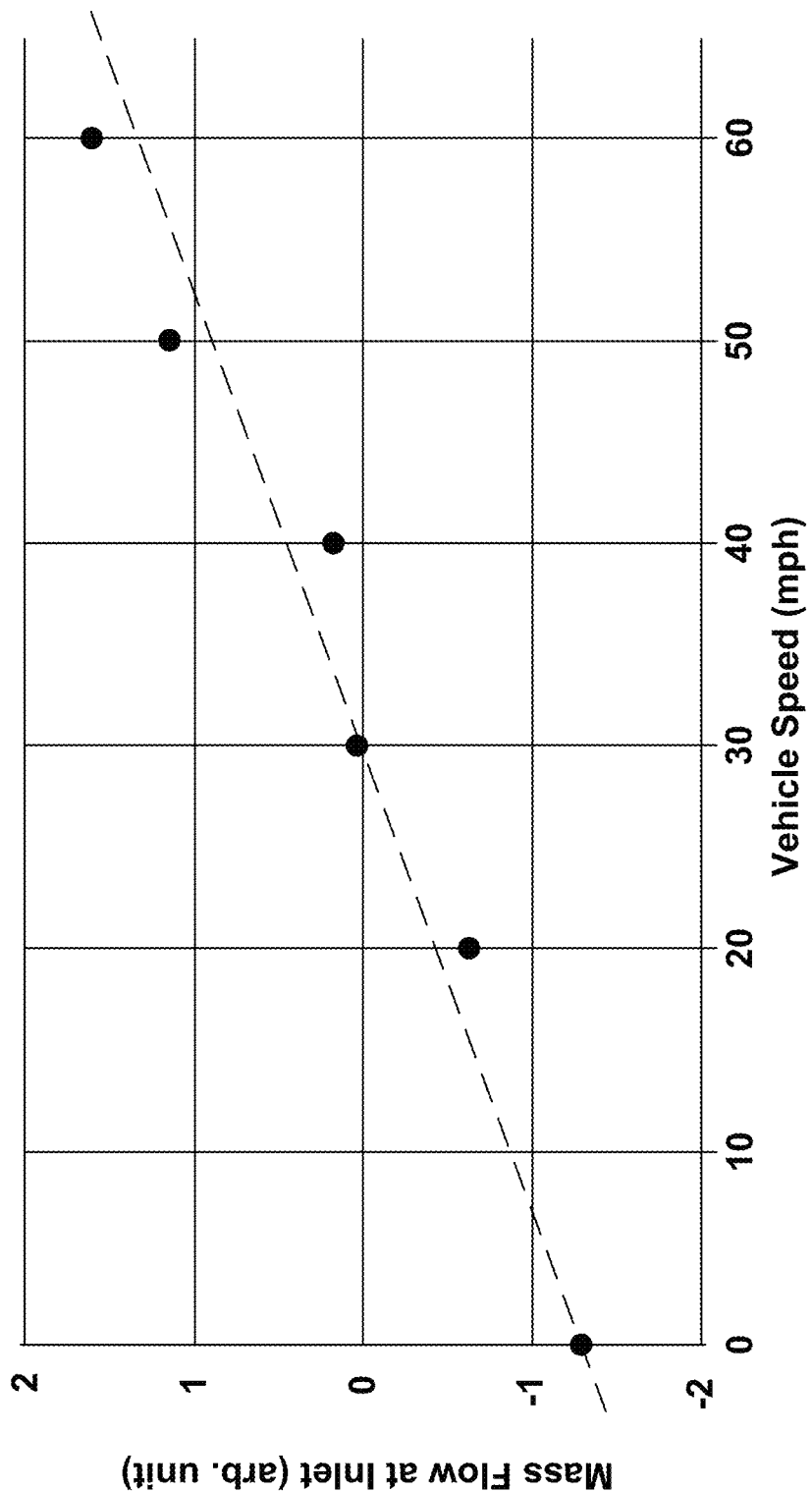
FIG. 6A is an illustration of a plot of convective airflow within the protective housing of a sensor unit of a moving vehicle, according to example embodiments.

FIG. 6A includes a plot of mass flow at an inlet (e.g., measured in arbitrary units (arb. unit)) vs. vehicle speed (e.g., in miles per hour (mph)). The inlet may be an inlet defined within the housing 412 of the sensor unit 400 (e.g., the inlet may be part of the additional cooling component 402 of the sensor unit 400). Further, the mass flow illustrated in FIG. 6A may be defined along an upward vertical direction (e.g., along the positive z-direction labeled in FIG. 4). As such, a negative mass flow may indicate a downward convective airflow 408 (e.g., flowing from the inlet at the top of the housing 412, through the housing 412, and out of an outlet at the bottom of the housing 412), a positive mass flow may indicate an upward convective airflow 408 (e.g., flowing from an outlet at the bottom of the housing 412, through the housing 412, and out of the inlet at the top of the housing 412), and a zero mass flow may indicate no convective airflow 408. The plot of FIG. 6A was generated based on numerical simulations (e.g., using a computational fluid dynamics (CFD) solver that employs the finite volume method (FVM)) of the fluid dynamics surrounding the vehicle 250 at different velocities. In generating the plot of FIG. 6A, the housing 412 and the lidar device 410 were also simulated as rotating about the shared axis 418. The points in the plot of FIG. 6A at various vehicle speeds represent simulation results, whereas the dashed line represents a regression generated based on the simulation results.

As illustrated in FIG. 6A, at low vehicle speeds, the convective airflow 408 may be downward (e.g., approximately at −1.2 arb. unit at 0 mph and approximately −0.7 arb. unit at 20 mph). However, at high vehicle speeds, the convective airflow 408 may be upward (e.g., approximately 1.1 arb. unit at 50 mph and approximately 1.6 arb. unit at 60 mph). Further, at a threshold speed (e.g., about 30 mph, as illustrated in FIG. 6A), the convective airflow 408 may be 0.0 arb. unit (i.e., there is no convective airflow 408 through the sensor unit 400). As described above, a low convective airflow 408 or a complete lack of convective airflow 408 can lead to internal heating of the protective housing 412. This effect is illustrated in FIG. 6B.

Figure 6B:
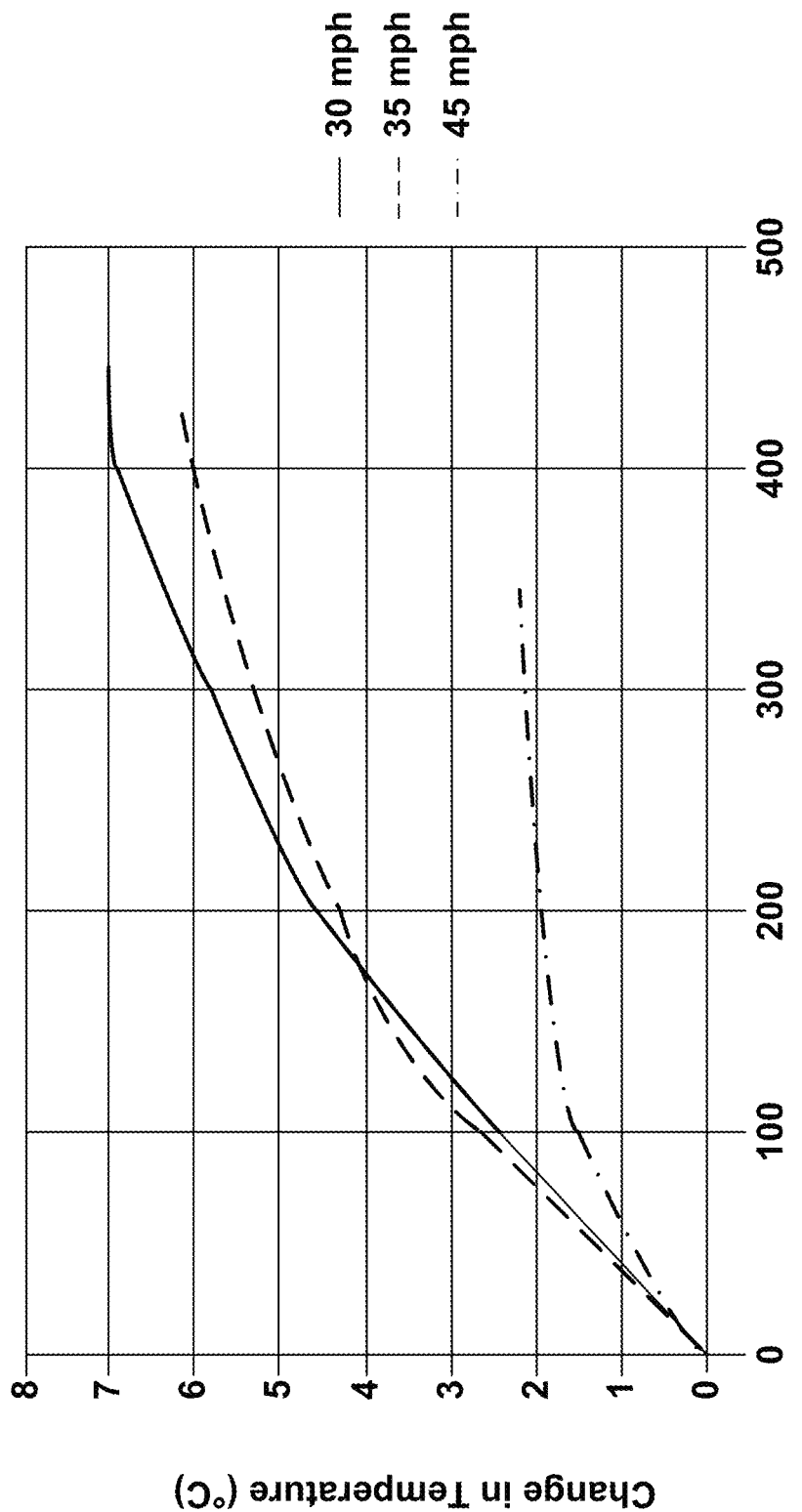
FIG. 6B is an illustration of a plot of temperature change within the protective housing of a sensor unit of a moving vehicle, according to example embodiments.

FIG. 6B illustrates a change in temperature (e.g., measured in ° C.) relative to the starting temperature inside the protective housing 412 with respect to time (e.g., measured in s) at different vehicle 250 velocities (e.g., 30 mph, 35 mph, and 45 mph). The plot of FIG. 6B was generated through physical measurements over time (e.g., using a thermocouple or thermistors) of temperatures within an example embodiment of a protective housing 412 at different vehicle 250 speeds while the sensor unit 400 was being rotated about the shared axis 418.

As illustrated in FIG. 6B, at vehicle 250 speeds closer to the threshold speed (e.g., the x-intercept illustrated in FIG. 6A), the change in temperature over time may be more pronounced. For example, the change in temperature over 300 s for a vehicle 250 speed of 30 mph corresponds to a temperature increase of ~5.8° C. and the change in temperature over 300 s for a vehicle 250 speed of 35 mph corresponds to a temperature increase of ~5.3° C. However, the change in temperature over 300 s for a vehicle 250 speed of 45 mph (which is further from the threshold speed illustrated in FIG. 6A than either 30 mph or 35 mph) corresponds to a temperature increase of ~2.1° C. In some embodiments, a temperature increase of 5° C. or more can result in degradation and/or destruction of the sensors within the sensor unit 400 and/or can cause results generated by the sensor within the sensor unit 400 to be unreliable. Further, when the vehicle 250 is actually operating in runtime (e.g., navigating a roadway in an autonomous or semi-autonomous mode), the speed of the vehicle 250 may be constantly changing (e.g., depending on traffic laws, surrounding traffic, obstacles in or near the road, the shape of the roadway, required turns, etc.). Hence, the amount of temperature change at any given time during operation may also be constantly changing.

In order to prevent degradation or destruction of sensors within the sensor unit 400 due to overheating and to prevent the vehicle 250 from needing to avoid certain driving speeds to prevent sensor degradation/destruction, example embodiments herein relate to incorporating a spoiler and a cowling into the sensor unit.

Figure 7A:
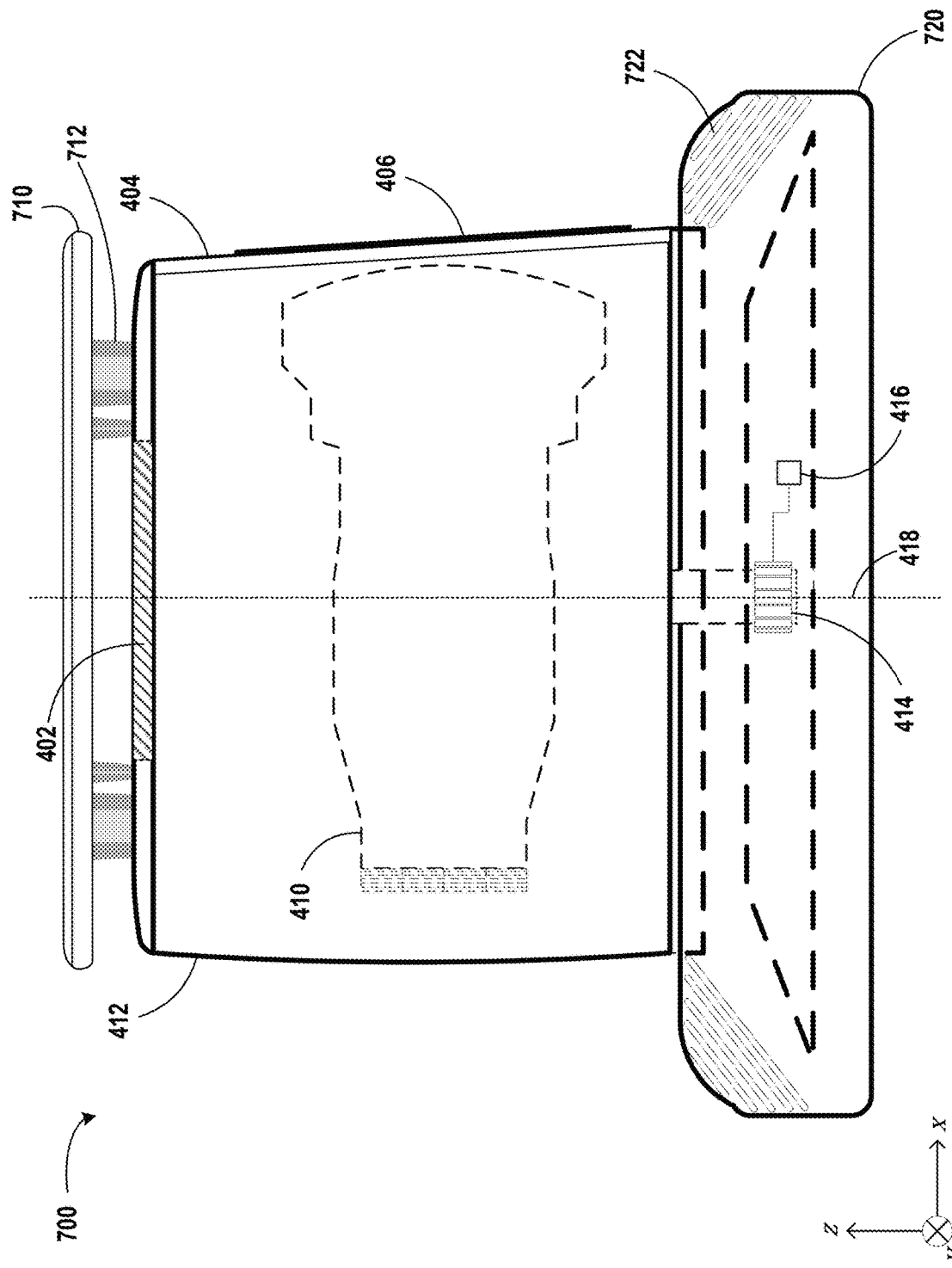
FIG. 7A is a side-view illustration of a sensor unit that includes a spoiler, according to example embodiments.

FIG. 7A illustrates a sensor unit 700 (e.g., a side view of the sensor unit 700). The sensor unit may be similar to the sensor unit 400 shown and described with respect to FIG. 4. For example, the sensor unit 700 may include a protective housing 412 with an additional cooling component 402 (e.g., an inlet) that allows a convective airflow 408 (not pictured in FIG. 7A to avoid cluttering FIG. 7A), an optical window 404, a window coating 406, a lidar device 410, and a rotating stage 414 with an associated controller 416 configured to rotate one or more components of the sensor unit 400 about a shared axis 418.

In addition to the components described above, though, the sensor unit 700 may also include a spoiler 710. In various embodiments, the spoiler 710 may be fabricated from metal or from injection-molded plastic. The spoiler 710 may be attached to the housing 412 (e.g., to a roof of the housing 412) using one or more connectors 712. Further, in some embodiments (as illustrated in FIG. 7A), the sensor unit 700 may include a mount 720 (e.g., that includes a cowling region) with one or more outlets 722 defined therein.

The spoiler 710 may be positioned on or near an inlet of the housing 412. For example, as illustrated in FIG. 7A, the spoiler 710 may include a disk portion that is positioned above a roof of the housing 412. In some embodiments, the roof of the housing 412 may be a planar roof (e.g., with an inlet defined within the planar roof) and the disk portion of the spoiler 710 may be positioned substantially parallel with the planar roof (e.g., within 1°, within 2°, within 3°, within 4°, within 5°, within 10°, within 15°, within 20°, or within 30° of parallel with the planar roof). The spoiler 710 may increase air pressure near the inlet of the housing 412 (e.g., when compared with the sensor unit 400 without a spoiler) and/or promote laminar (as opposed to turbulent) flow of a surrounding ambient airflow (e.g., the ambient airflow 500 shown and described with reference to FIG. 5). Either or both of these functions of the spoiler 710 may enhance a subsequent airflow through the housing 412 used to cool the lidar device 410 or other components within the sensor unit 400. For example, the spoiler 710 may increase the air pressure near the inlet of the housing 412 such that, irrespective of the speed of the vehicle 250, a pressure differential between the outside of the housing 412 and the inside of the housing 412 is maintained (e.g., thereby resulting in the convective airflow 408 from an inlet of the housing 412 through to an outlet of the housing 412 irrespective of vehicle 250 speed).

Further, in some embodiments, the spoiler 710 may increase the air pressure near the inlet of the housing 412 (e.g., relative to the sensor unit 400 without a spoiler) and/or promote laminar flow of the surrounding airflow (e.g., relative to the sensor unit 400 without a spoiler) without increasing or without significantly increasing a drag force on the sensor unit 700 as a result of an inclusion of the spoiler 710. Hence, the spoiler 710 may enhance passive cooling of the components within the housing 412 of the sensor unit 700 during operation of the sensor unit 700/the vehicle 250 without reducing an energy used to rotate the sensor unit 400 about the shared axis 418 (e.g., using the rotating stage 414) and/or without adversely impacting fuel efficiency of the vehicle 250. For example, as illustrated in FIG. 7A, the disk portion of the spoiler 710 may include one or more rounded edges (e.g., the disk portion may be circular in shape with the entire circumference of the circle having a rounded shape). Such rounded edge(s) may assist in reducing the amount of drag generated (if any) by the spoiler 710.

Additionally, in some embodiments (e.g., to further reduce drag generated), the spoiler 710 may be configured to rotate about the shared axis 418 along with the housing 412. For example, as illustrated in FIG. 7A, the spoiler 710 may be directly attached to the housing 412 using one or more connectors 712. As such, whenever the housing 412 is rotated (e.g., by the rotating stage 414), the spoiler 710 may consequently also be rotated about the shared axis 418. By rotating about the shared axis 418 along with the housing 412, additional airflows that may otherwise be generated as a result of relative motion the spoiler 710 and the housing 412 may be avoided. While the spoiler 710 may rotate about the shared axis 418 with the housing 412 in various embodiments, it is understood that other embodiments also exist and are contemplated herein. For example, the spoiler 710 may be disconnected from the housing 412 in some embodiments and configured to remain stationary while the housing 412 is rotated about the shared axis.

Figure 7B:
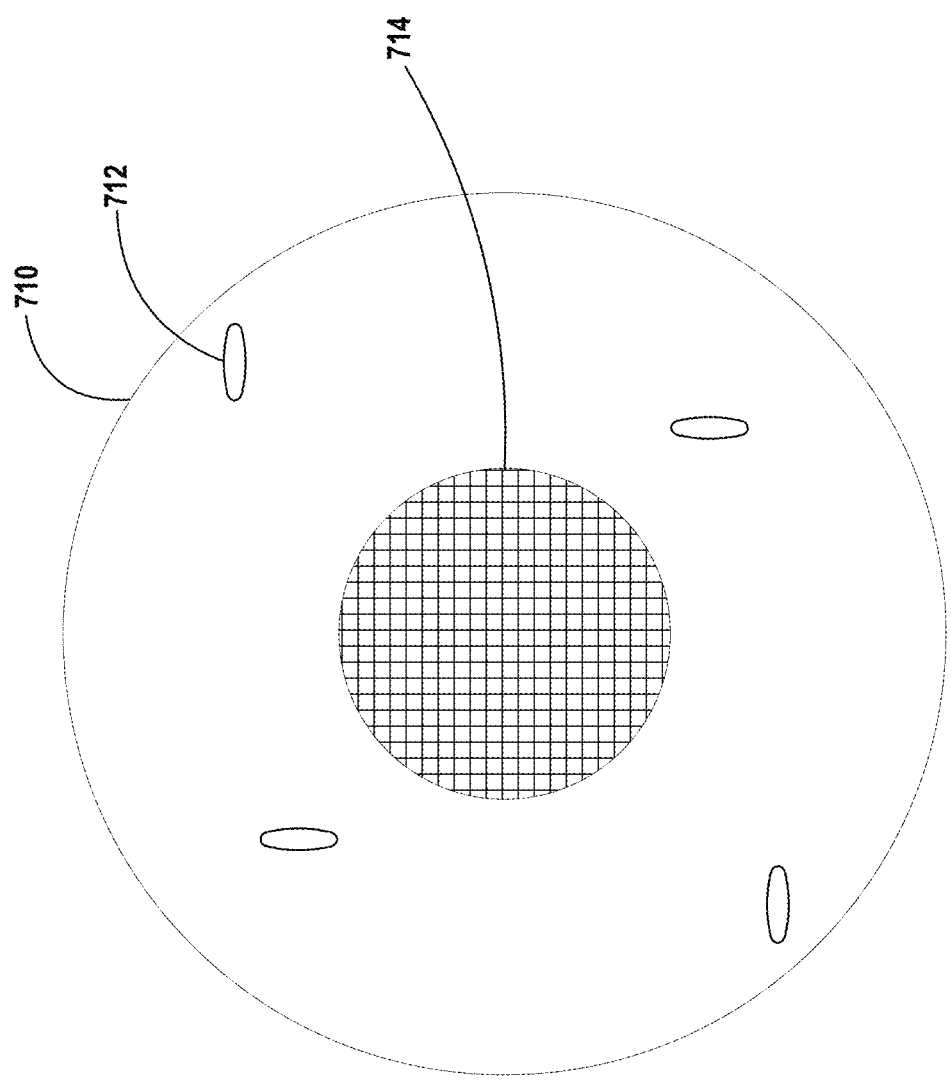
FIG. 7B is a bottom-view illustration of a spoiler, according to example embodiments.

The connectors 712, as illustrated in FIG. 7A, may be used to attach the spoiler 710 to the housing 412 (e.g., to a roof of the housing 412). In some embodiments, the connectors 712 may include one or more fins. For example, as illustrated in FIGS. 7A and 7B, the connectors 712 may include one or more fins that are elliptically shaped and are slightly tapered (e.g., tapered in the x-direction and/or y-direction illustrated in FIG. 7A) from the connection point with the disk portion of the spoiler 710 to the connection point with the housing 412. Further, the connectors 712 may be shaped or positioned (e.g., in location and/or orientation) based on a direction of rotation of the housing 412/one or more sensors in the housing 412 (e.g., the lidar device 410) about the shared axis 418 in order to further promote the airflow 408 through the housing 412. Additionally, the connectors 712 may not include any sharp edges in order to prevent unnecessary drag forces from being induced by the connectors 712. While example embodiments shown and described herein disclose attaching the spoiler 710 to the housing 412, it is understood that other embodiments are also possible. For example, the spoiler 710 may be mounted to the vehicle 250 and cantilevered over the top of the housing 412 using an armature. Alternatively, the spoiler 710 may be attached to a secondary housing that is separate from the housing 412 and surrounds the housing 412, in some embodiments. Further, in some embodiments, the spoiler 710 may remain stationary while the housing 412 and/or the lidar device 410 rotate about the shared axis 418. Other embodiments are also possible and are contemplated herein.

The mount 720 may be used to attach the sensor unit 700 to the vehicle 250 (e.g., to a roof of the vehicle 250). In some embodiments, the mount 720 may be configured to remain stationary relative to the housing 412 and one or more sensors of the sensor unit 700 (e.g., the lidar device 410) as the housing 412 and the one or more sensors rotate about the shared axis 418 (e.g., using the rotating stage 414). Further, the housing 412 may be seated within the mount 720 such that an airflow (e.g., the convective airflow 408) can pass from an inlet of the housing 412 (e.g., the additional cooling component 402) through the housing 412 and into the mount 720 (e.g., into an interior portion of the mount 720 via one or more openings in the bottom of the housing 412).

As illustrated in FIG. 7A, the mount 720 may also include a cowling (e.g., a region that extends above the base of the sensor unit 700 and at least partially covers/surrounds the base and/or at least partially covers/surrounds a portion of the housing 412). In some embodiments, the cowling may include one or more outlets 722 defined therein. The outlets 722 may be slits and/or louvers within the cowling, for example. It is understood that other types of outlets 722 are also possible and are contemplated herein. Further, the outlets 722 may be configured to act as an air outtake for the convective airflow 408 once the convective airflow 408 leaves from the housing 412 and enters the cowling (e.g., via one or more openings in the bottom of the housing 412).

FIG. 7B illustrates the spoiler 710 (e.g., a bottom view of the spoiler 710) illustrated and described with reference to FIG. 7A (e.g., when the spoiler is not attached to the housing 412 and is not yet integrated into a sensor unit 700). As illustrated, the spoiler 710 may include one or more spoiler perforations 714. The spoiler perforations 714 may be defined within and pass through a disk portion of the spoiler 710. Further, the spoiler perforations 714 may promote airflow (e.g., the convective airflow 408) into the housing 412. For example, the spoiler perforations 714 may allow ambient air to enter the housing 412 through an inlet of the housing (e.g., the additional cooling component 402) to generate the convective airflow 408. The shapes, sizes, and locations of the spoiler perforations 714 in FIG. 7B and the relative area of the disk portion of the spoiler 710 occupied by the spoiler perforations 714 are provided solely as examples. It is understood that other numbers, locations, sizes, and relative areas of the spoiler perforations 714 are also possible and are contemplated herein. For example, the spoiler perforations 714 may instead be positioned near a periphery of the disk portion of the spoiler 710 and/or multiple non-contiguous regions of the disk portion of the spoiler 710 may include spoiler perforations 714. Further, while spoiler perforations 714 are illustrated in FIG. 7B, it is understood that additional or alternative types of openings or types of spoiler intakes are also possible and are contemplated herein.

As also illustrated in FIG. 7B, the spoiler 710 may include four connectors 712. The four connectors 712 may extend approximately perpendicularly outward (e.g., downward) from an approximately planar surface of a disk portion of the spoiler 710 (e.g., along the z-axis, as illustrated in FIG. 7B). As also illustrated and described herein, the connectors 712 may be elliptically shaped and may be positioned (e.g., in location and orientation) and/or shaped such that the connectors 712 promote the convective airflow 408 through the housing 412. Such a positioning and/or shaping of the connectors 712 may be based on the anticipated direction and/or speed of rotation of the housing 412 during operation of the sensor unit 700 and/or on one or more anticipated velocities of the vehicle 250 on which the sensor unit 700 will be mounted during operation of the sensor unit 700. While four elliptically shaped connectors 712 are illustrated in FIG. 7B, it is understood that other numbers and shapes of connectors are also possible and are contemplated herein (e.g., one connector, two connectors, three connectors, five connectors, six connectors, seven connectors, eight connectors, nine connectors, ten connectors, etc. and/or circularly shaped connectors, triangularly shaped connectors, rectangularly shaped connectors, pentagonally shaped connectors, hexagonally shaped connectors, heptagonally shaped connectors, octagonally shaped connectors, nonagonally shaped connectors, decagonally shaped connectors, etc.). Further, alternative positions and orientations of the connectors are also possible and are contemplated herein. For example, one or more of the connectors may be oriented at an angle relative to the planar surface of the disk portion of the spoiler 710 (e.g., the connectors may be angled toward the shared axis 418 as they extend downward from the disk portion of the spoiler 710 so as to funnel some ambient air into an inlet of the housing 412 to promote the convective airflow 408).

Figure 7C:
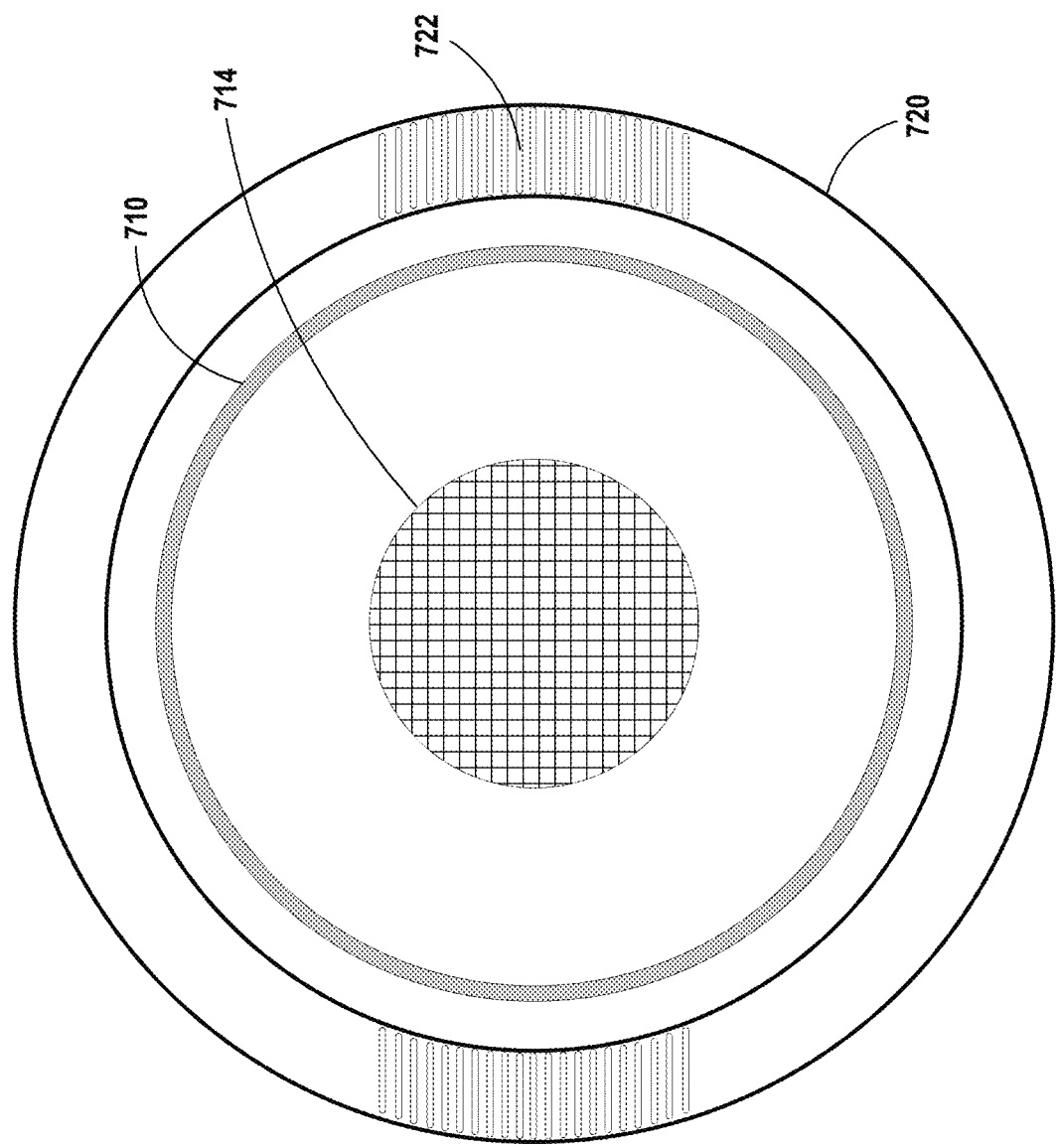
FIG. 7C is a top-view illustration of a sensor unit that includes a spoiler, according to example embodiments.

FIG. 7C is an additional illustration of the sensor unit 700 (e.g., a top view of the sensor unit 700) illustrated and described with reference to FIG. 7A. As illustrated, the spoiler 710 may include a disk portion (e.g., a circular disk portion that is perpendicular to the z-axis and the direction of flow of the convective airflow 408) with spoiler perforations 714 located in a central region of the disk portion.

Example embodiments of the outlets 722 of the cowling portion of the mount 720 are also illustrated in FIG. 7C. As illustrated, two sides of the cowling may have outlets 722 defined therein. The outlets 722 may be positioned near areas of low relative pressure to further promote the convective airflow 408 through the housing 412. However, this is provided solely as an example, and it is understood that other shapes, sizes, numbers, and positions of the outlets 722 are also possible. For example, the outlet may instead be a single annular opening defined within the cowling that extends around the periphery of the housing 412. Alternatively, the outlets 722 may include slits or louvers (similar to those illustrated in FIG. 7C) that extend an entire periphery of the housing 412 (e.g., instead of only around certain portions of the housing 412, as illustrated in FIG. 7C). In still other embodiments, the outlets 722 may include perforations defined within the housing 412. Other embodiments of the outlets 722 are also possible and are contemplated herein.

Although the spoiler 710 is illustrated in FIGS. 7A-7C as including a circular disk portion that is parallel to the housing 412, it is understood that this is only provided as an example. Other shapes and sizes of the spoiler 710 are also possible and are contemplated herein (e.g., other spoiler shapes and sizes that similarly increase an air pressure near the inlet of the housing 412 and/or promote laminar flow near the inlet of the housing 412). For example, in some embodiments the spoiler 710 may include only fins extending outward from a roof of the housing 412.

Figure 8:
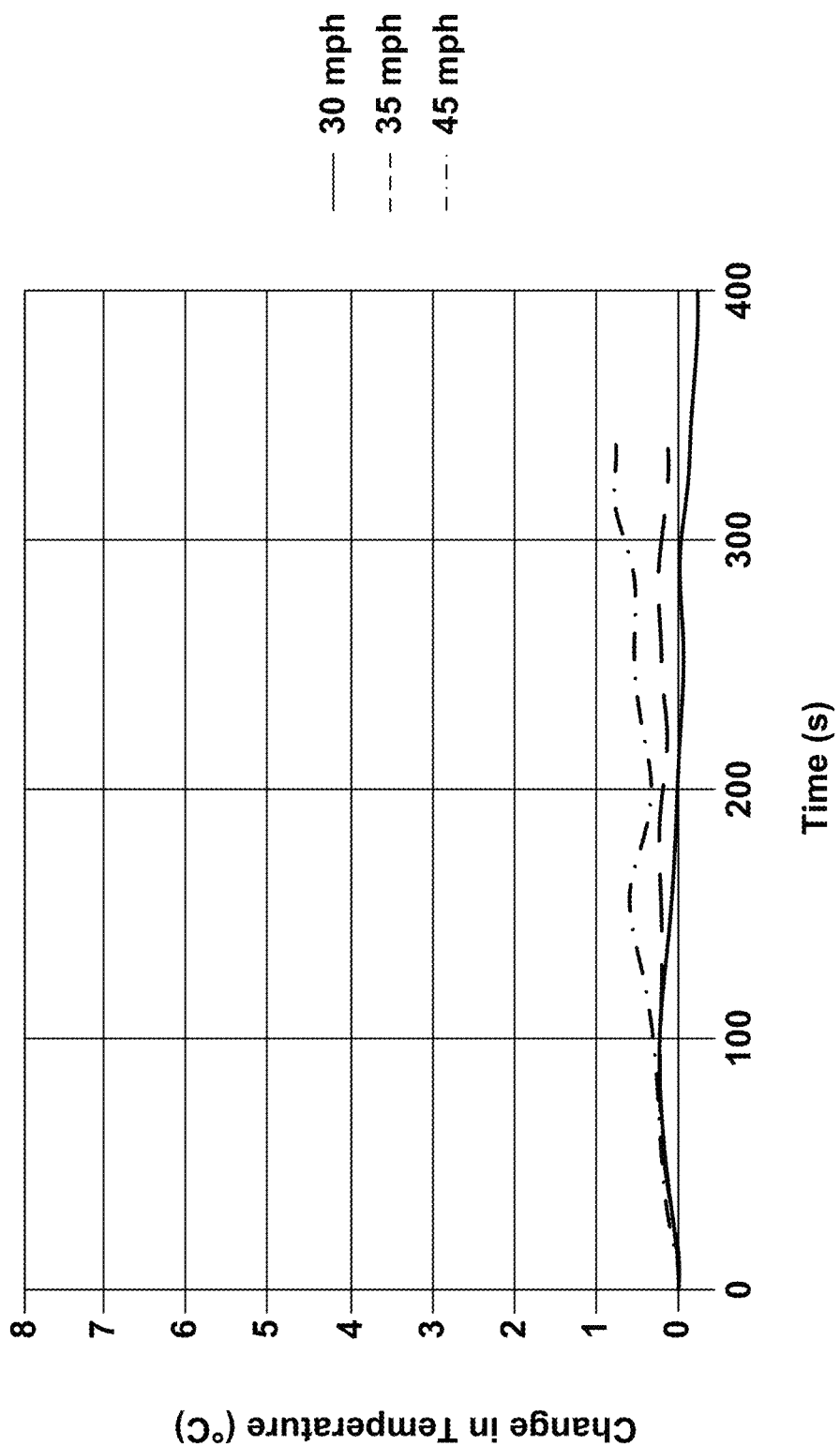
FIG. 8 is an illustration of a plot of temperature change within the protective housing of a sensor unit that includes a spoiler while the sensor unit is attached to a moving vehicle, according to example embodiments.

FIG. 8 includes a plot of temperature change (e.g., measured in ° C.) with respect to time (e.g., measured in seconds (s)) within the protective housing of a sensor unit (e.g., the housing 412 of the sensor unit 700) that includes a spoiler (e.g., the spoiler 710) while the sensor unit is attached to a moving vehicle (e.g., the vehicle 250) for various vehicle speeds (e.g., measured in mph), according to example embodiments. The plot illustrated in FIG. 8 was generated based on numerical simulations (e.g., using a CFD solver that employs FVM) of the fluid dynamics surrounding the vehicle 250 operating at different velocities with the sensor unit 700 mounted thereon. In generating the plot of FIG. 8, the housing 412, the lidar device 410, and the spoiler 710 were also simulated as rotating about the shared axis 418.

As illustrated by comparing the results of FIG. 8 to the results of FIG. 6B, the sensor unit 700 (e.g., the sensor unit 700 shown and described with reference to FIGS. 7A-7C) that includes the spoiler 710 reduced the temperature variation inside the housing 412 during operation of the sensor unit 700. For example, the changes in temperature inside the housing 412 over the course of 300 s were about 0.0° C., 0.2° C., and 0.7° C. for vehicle velocities of 30 mph, 35 mph, and 45 mph, respectively. These values are clearly significantly lower than the temperature change values for similar vehicle velocities shown and described with reference to FIG. 6B. Further, the temperature change values illustrated in FIG. 8 remain significantly below a threshold temperature increase of 5° C., which can result in degradation and/or destruction of the sensors within the sensor unit 700 and/or can cause results generated by the sensor within the sensor unit 700 to be unreliable. As such, the spoiler 710 effectively promotes the convective airflow 408 within the housing 412, thereby preventing an increase in temperature within the housing 412.

As described above, in some embodiments, a vehicle (e.g., the vehicle 200 shown and described with reference to FIGS. 2A-2E or the vehicle 250 shown and described with reference to FIGS. 2F-2K) can include a sensor unit 400/700 mounted on top of the vehicle. However, in some embodiments, a plurality of sensor units 400/700 may be mounted on top of a vehicle (e.g., to perform object detection and avoidance). An example vehicle may include two sensor units 700 (e.g., including spoilers 710 and mounts 720) mounted at the locations of the sensor systems 204A, 204B illustrated in FIGS. 2F-2I. For example, a first sensor unit may be cantilevered above a portion of a road surface that is adjacent to a first door of the tractor portion (e.g., a passenger-side door of the tractor portion at the location of the sensor system 204A illustrated in FIGS. 2F-2I) and a second sensor unit may be cantilevered above a portion of the road surface that is adjacent to a second door of the tractor portion (e.g., a driver-side door of the tractor portion at the location of the sensor system 204B illustrated in FIGS. 2F-2I). In alternate embodiments, both the first sensor unit and the second sensor unit could be positioned near the same side of the vehicle (e.g., both on the driver side of the vehicle or both on the passenger side of the vehicle). Further, the first sensor unit and the second sensor unit may include the same type of sensors (e.g., both include lidars, both include radars, both include cameras, etc.) or different types of sensors (e.g., the first sensor unit includes lidar(s) while the second sensor unit includes radar(s), the first sensor unit includes radar(s) while the second sensor unit includes camera(s), etc.).

As described above, the first sensor unit and the second sensor unit may be attached to a roof of the tractor portion of the vehicle. However, it is understood that other mounting points are also possible and are contemplated herein (e.g., a roof of the trailer portion of the vehicle, a grill of the tractor portion of the vehicle, a hood of the tractor portion of the vehicle, a bottom of the trailer portion of the, a rear of a trailer portion of the vehicle, etc.). Further, while two sensor units may be attached to the vehicle, as described above, it is also understood that other numbers of sensor units are also possible and are contemplated herein (e.g., one sensor unit, three sensor units, four sensor units, five sensor units, six sensor units, seven sensor units, seven sensor units, eight sensor units, nine sensor units, etc.).

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A device comprising:
   one or more sensors configured to sense one or more aspects of an environment surrounding the device;
   a housing that at least partially surrounds the one or more sensors, wherein the housing and the one or more sensors are configured to rotate about a shared axis, wherein the housing comprises an inlet configured to act as an air intake for an airflow through the housing, and wherein the airflow is configured to cool the one or more sensors while the one or more sensors are operating; and
   a spoiler positioned on or near the inlet, wherein the spoiler is configured to increase an air pressure near the inlet or promote laminar flow near the inlet in order to promote the airflow through the housing.

2. The device of claim 1,
   wherein the housing comprises a planar roof,
   wherein the inlet is defined within the planar roof,
   wherein the spoiler comprises a disk portion, and
   wherein a plane of the disk portion is substantially parallel with the planar roof.

3. The device of claim 2, wherein the disk portion of the spoiler comprises one or more spoiler perforations to promote the airflow through the housing.

4. The device of claim 3, wherein the one or more spoiler perforations are located in a central region of the disk portion.

5. The device of claim 2, wherein the disk portion of the spoiler comprises a rounded edge.

6. The device of claim 2, wherein the inlet comprises one or more housing perforations in the planar roof.

7. The device of claim 1, wherein the spoiler is also configured to rotate about the shared axis.

8. The device of claim 1, further comprising a mount,
   wherein the housing is seated within the mount such that the airflow is configured to pass from the inlet through the housing and into the mount,
   wherein the mount is configured to remain stationary relative to the housing and the one or more sensors as the housing and the one or more sensors rotate about the shared axis,
   wherein the mount comprises a cowling that at least partially surrounds a portion of the housing,
   wherein an outlet is defined within the cowling,
   wherein the outlet comprises one or more slits or louvers, and
   wherein the outlet is configured to act as an air outtake for the airflow upon the airflow passing into the mount.

9. The device of claim 1, wherein the one or more sensors comprise one or more light detection and ranging (lidar) sensors.

10. The device of claim 1, wherein the spoiler is attached to the housing using one or more connectors.

11. The device of claim 10, wherein the one or more connectors comprise one or more fins, and wherein the one or more fins are shaped or positioned to promote the airflow through the housing.

12. The device of claim 11, wherein the one or more fins are shaped or positioned based on a direction of rotation of the housing and the one or more sensors about the shared axis.

13. The device of claim 1, wherein the airflow through the housing is directed along a vector that is substantially parallel to the shared axis.

14. The device of claim 1, wherein the spoiler comprises injection-molded plastic.

15. The device of claim 1, wherein a wall of the housing comprises an aperture or a window, and wherein the aperture or the window is configured to permit at least one of the one or more sensors to sense the one or more aspects of the environment surrounding the device.

16. A system comprising:
a vehicle;
one or more sensors configured to sense one or more aspects of an environment surrounding the system, wherein the one or more sensors are mounted to the vehicle;
a housing that at least partially surrounds the one or more sensors, wherein the housing and the one or more sensors are configured to rotate about a shared axis, wherein the housing comprises an inlet configured to act as an air intake for an airflow through the housing, and wherein the airflow is configured to cool the one or more sensors while the one or more sensors are operating; and
a spoiler positioned on or near the inlet, wherein the spoiler is configured to increase an air pressure near the inlet or promote laminar flow near the inlet in order to promote the airflow through the housing.

17. The system of claim 16, wherein at least one of the one or more sensors is a light detection and ranging (lidar) sensor.

18. The system of claim 16, wherein the vehicle is a semi-truck comprising a tractor.

19. The system of claim 18, wherein the one or more sensors are mounted on a roof of the tractor, and wherein the one or more sensors are cantilevered above a portion of a road surface that is adjacent to a driver-side door of the tractor or a passenger-side door of the tractor.

20. The system of claim 16,
wherein the housing comprises a planar roof,
wherein the inlet is defined within the planar roof,
wherein the spoiler comprises a disk portion, and
wherein a plane of the disk portion is substantially parallel with the planar roof.

* * * * *